US008576276B2

(12) United States Patent
Bar-Zeev et al.

(10) Patent No.: US 8,576,276 B2
(45) Date of Patent: Nov. 5, 2013

(54) HEAD-MOUNTED DISPLAY DEVICE WHICH PROVIDES SURROUND VIDEO

(75) Inventors: Avi Bar-Zeev, Redmond, WA (US); Alex Aben-Athar Kipman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 12/949,147

(22) Filed: Nov. 18, 2010

(65) Prior Publication Data

US 2012/0127284 A1    May 24, 2012

(51) Int. Cl.
*G02B 27/01* (2006.01)
*G06F 3/01* (2006.01)

(52) U.S. Cl.
USPC .................................. 348/53; 345/8

(58) Field of Classification Search
None
See application file for complete search history.

(56) References Cited

U.S. PATENT DOCUMENTS

| | | | |
|---|---|---|---|
| 5,850,352 A | 12/1998 | Moezzi et al. | |
| 7,301,536 B2 * | 11/2007 | Ellenby et al. | 345/419 |
| 7,395,507 B2 * | 7/2008 | Robarts et al. | 715/744 |
| 7,542,012 B2 * | 6/2009 | Kato et al. | 345/8 |
| 7,688,346 B2 | 3/2010 | Richards | |
| 2002/0039085 A1 * | 4/2002 | Ebersole et al. | 345/8 |
| 2006/0038833 A1 | 2/2006 | Mallinson et al. | |
| 2007/0273610 A1 * | 11/2007 | Baillot | 345/8 |
| 2008/0111832 A1 | 5/2008 | Emam et al. | |
| 2009/0237492 A1 * | 9/2009 | Kikinis et al. | 348/47 |
| 2009/0244097 A1 | 10/2009 | Estevez | |

OTHER PUBLICATIONS

Brogni, et al. "Technological Approach for Cultural Heritage: Augmented Reality." In Proceedings of the 8th IEEE International Workshop on Robot and Human Interaction (RO-MAN), Sep. 27-29, 1999, pp. 206-212, Pisa, Italy.

Fehn, Christoph and Peter Kauff. "Interactive Virtual View Video (IVVV)—The Bridge Between Immersive TV and 3D-TV." In Proceedings of SPIE Three-Dimensional TV, Video and Display I, Jul. 2002, pp. 14-25, Boston, MA, USA.

Fehn, C., P. Kauff and R Schafer. "Interactive Virtual View Video for Immersive TV Applications." In Proceedings of International Broadcast Conference, Sep. 2001, pp. 53-62, Amsterdam, The Netherlands.

"FTV (Free Viewpoint Television) [online]." Retrieved from the Internet on Jul. 29, 2010: URL: <http://www.tanimoto.nuee.nagoya-u.ac.jp/study/FTV/index-e.html>, 1 page.

(Continued)

*Primary Examiner* — Jay Patel
*Assistant Examiner* — Reza Aghevli
(74) *Attorney, Agent, or Firm* — Vierra Magen Marcus LLP

(57) ABSTRACT

A see-through head-mounted display (HMD) device, e.g., in the form of augmented reality glasses, allows a user to view a video display device and an associated augmented reality image. In one approach, the augmented reality image is aligned with edges of the video display device to provide a larger, augmented viewing region. The HMD can include a camera which identifies the edges. The augmented reality image can be synchronized in time with content of the video display device. In another approach, the augmented reality image video provides a virtual audience which accompanies a user in watching the video display device. In another approach, the augmented reality image includes a 3-D which appears to emerge from the video display device, and which is rendered from a perspective of a user's location. In another approach, the augmented reality image can be rendered on a vertical or horizontal surface in a static location.

20 Claims, 26 Drawing Sheets

(56) References Cited

OTHER PUBLICATIONS

"Future of Television May Be Immersive." Accenture [online]. Retrieved from the Internet on Jul. 29, 2010: URL: <http://www.accenture.com/Global/Services/By_Industry/Communications/Access_Newsletter/Article_Index/FutureImmersive.htm>, pp. 1-2.

Hardesty, Larry. "MIT Media Lab unveils 'Surround Vision.'" Apr. 9, 2010, retrieved from the Internet on Nov. 18, 2010: URL: <http://web.mit.edu/press/2010/augmented-tv>, 2 pages.

Kahney, Leander. "Get Ready for Surround Video," Wired [online]. Mar. 11, 1999, retrieved from the Internet on Jul. 28, 2010: URL: <http://www.wired.com/science/discoveries/news/1999/03/18364>, pp. 1-3.

Loos, Ben. "The future of TV. Interactive and 3D without glasses." Experience Information [online], Jun. 10, 2009, retrieved from the Internet on Jul. 29, 2010: URL: <http://experienceinformation.blogspot.com/2009/06/future-of-tv-interactive-and-3d-without.html>, pp. 1-3.

"Surround Video." Wikipedia [online]. Retrieved from the Internet on Jul. 28, 2010, URL: <http://en.wikipedia.org/wiki/Surround_Video>, 1 page.

Wynants, Nele, Kurt Vanhoutte and Philippe Bekaert. "Being inside the image. Heightening the sense of presence in a video captured environment through artistic means: the case of CREW," in Proceedings of the 11th Annual International Workshop on Presence, Oct. 16-18, 2008, pp. 1-7, Padova, Italy.

\* cited by examiner

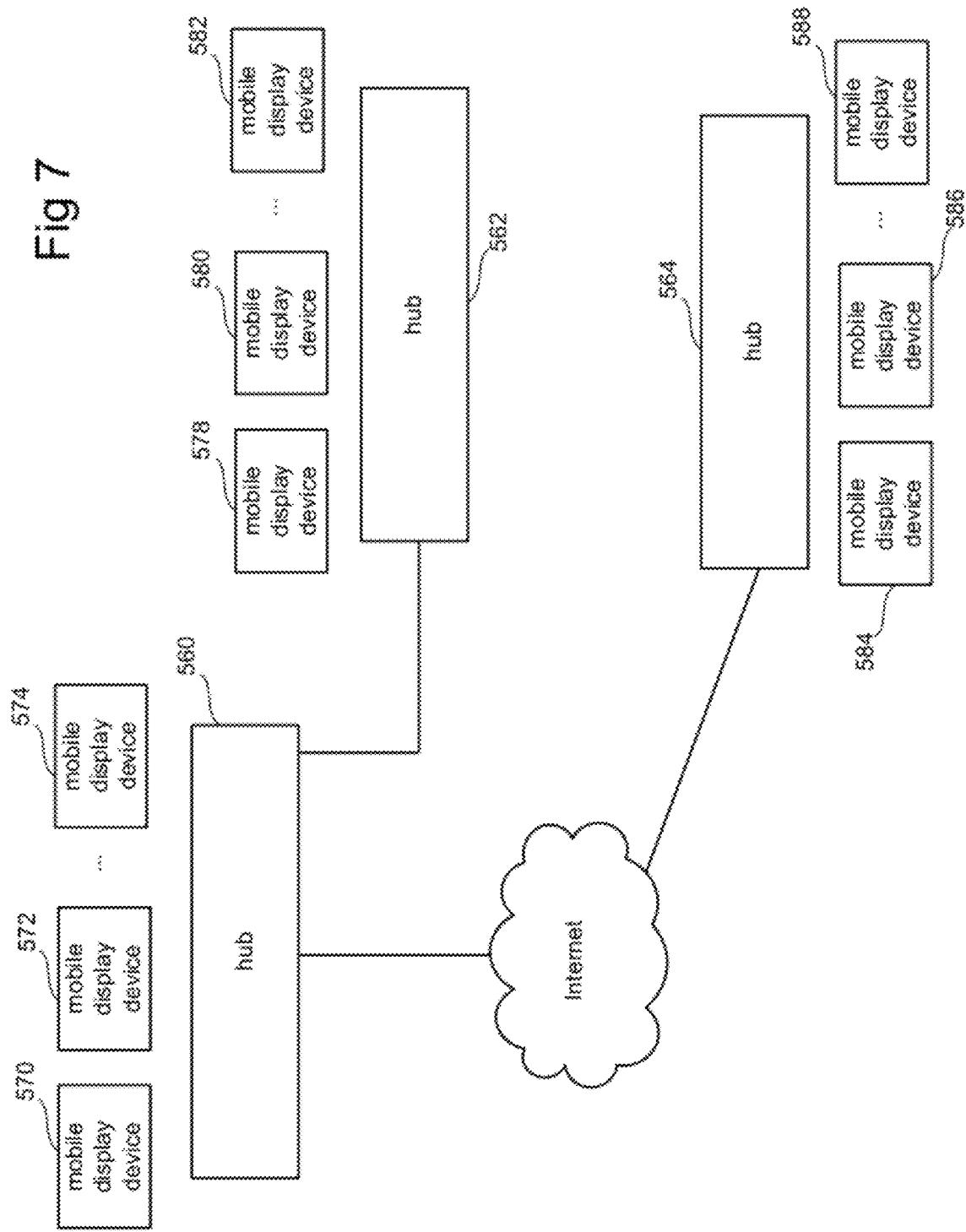

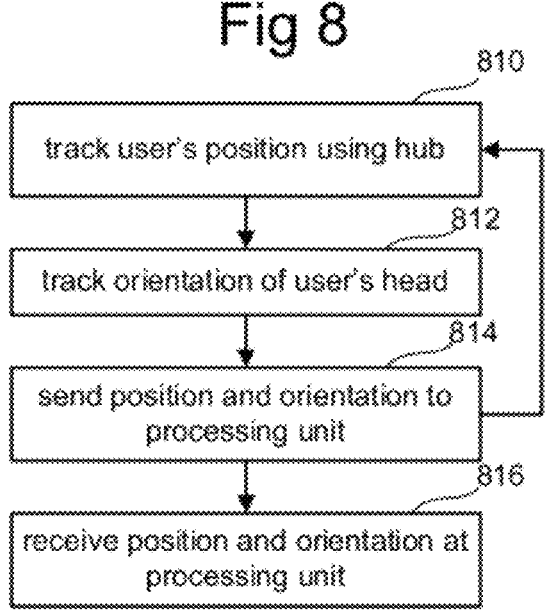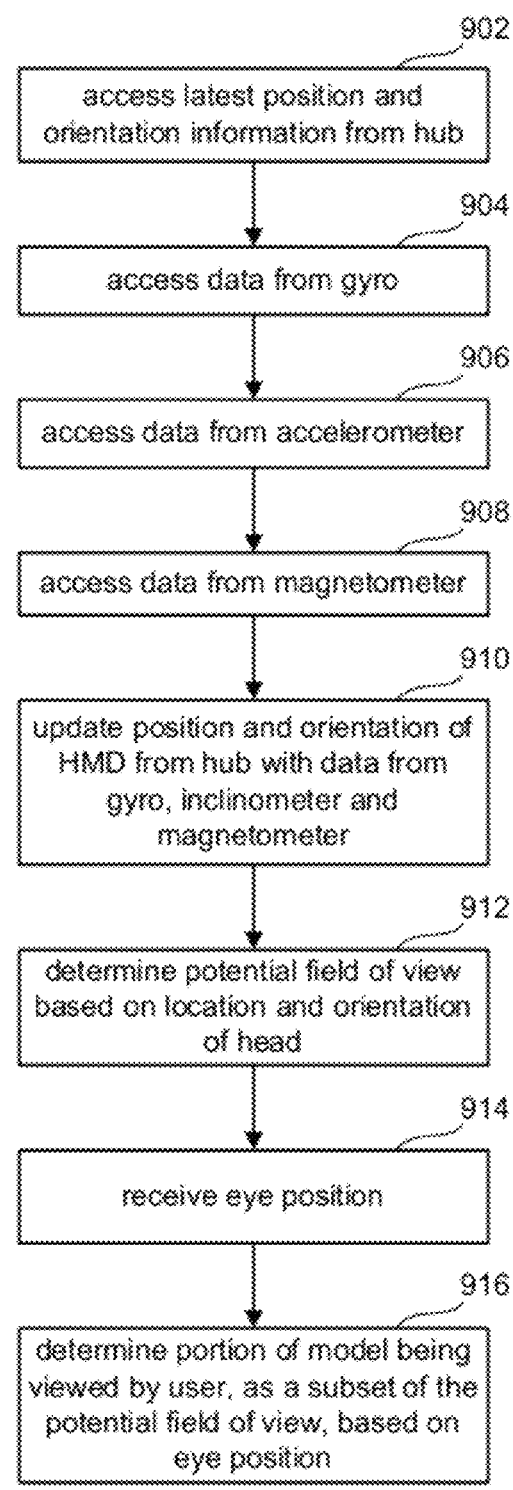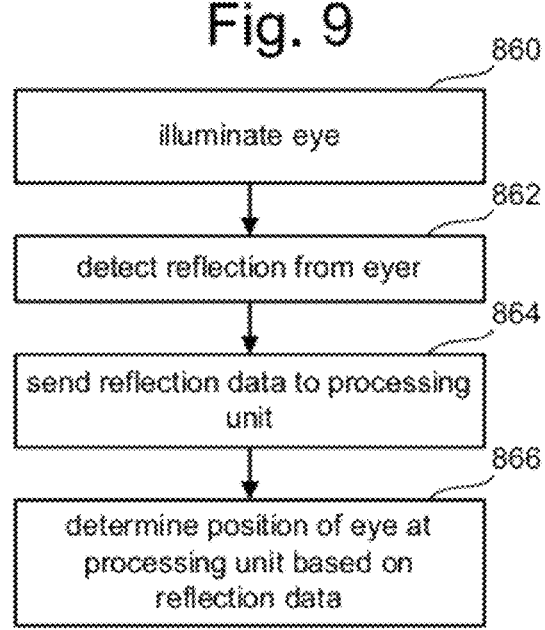

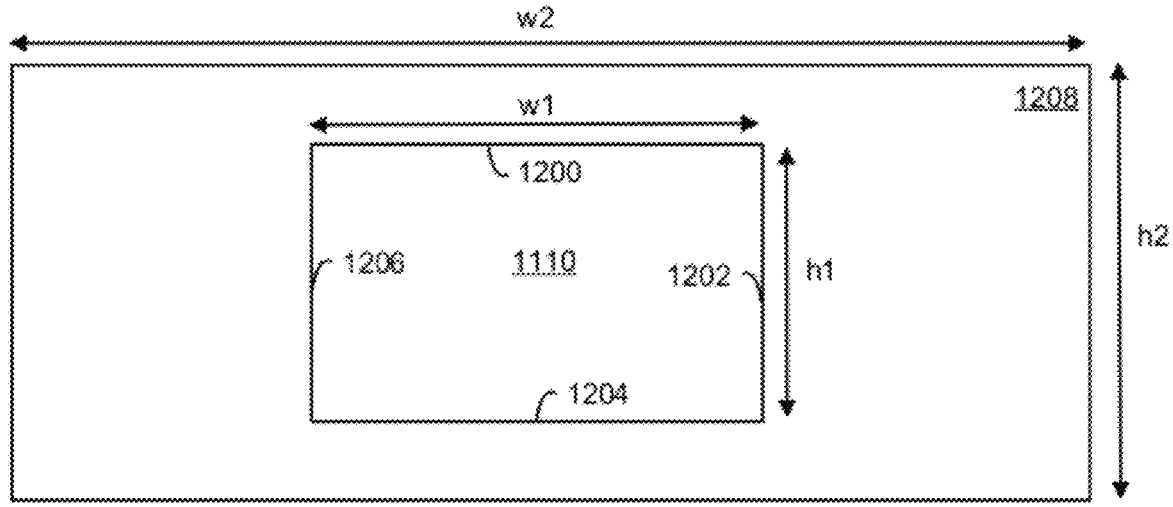
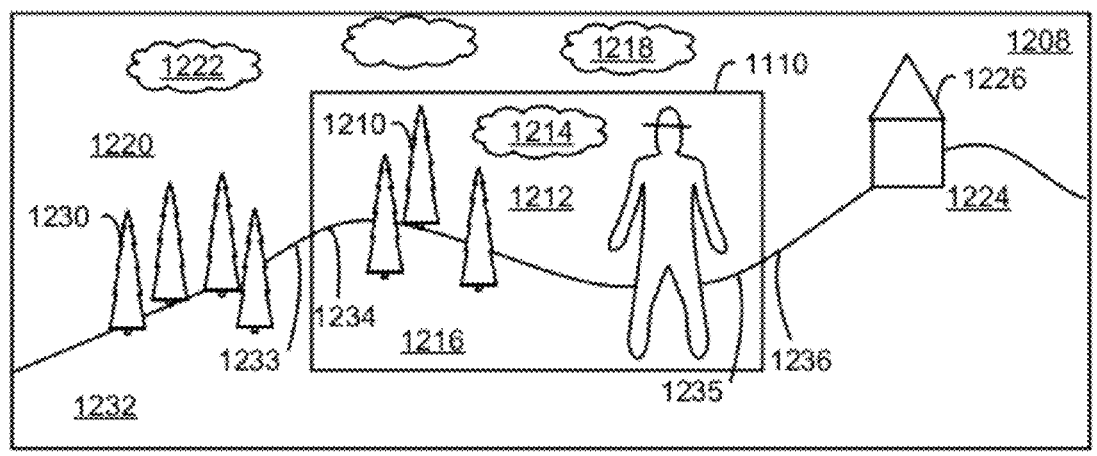

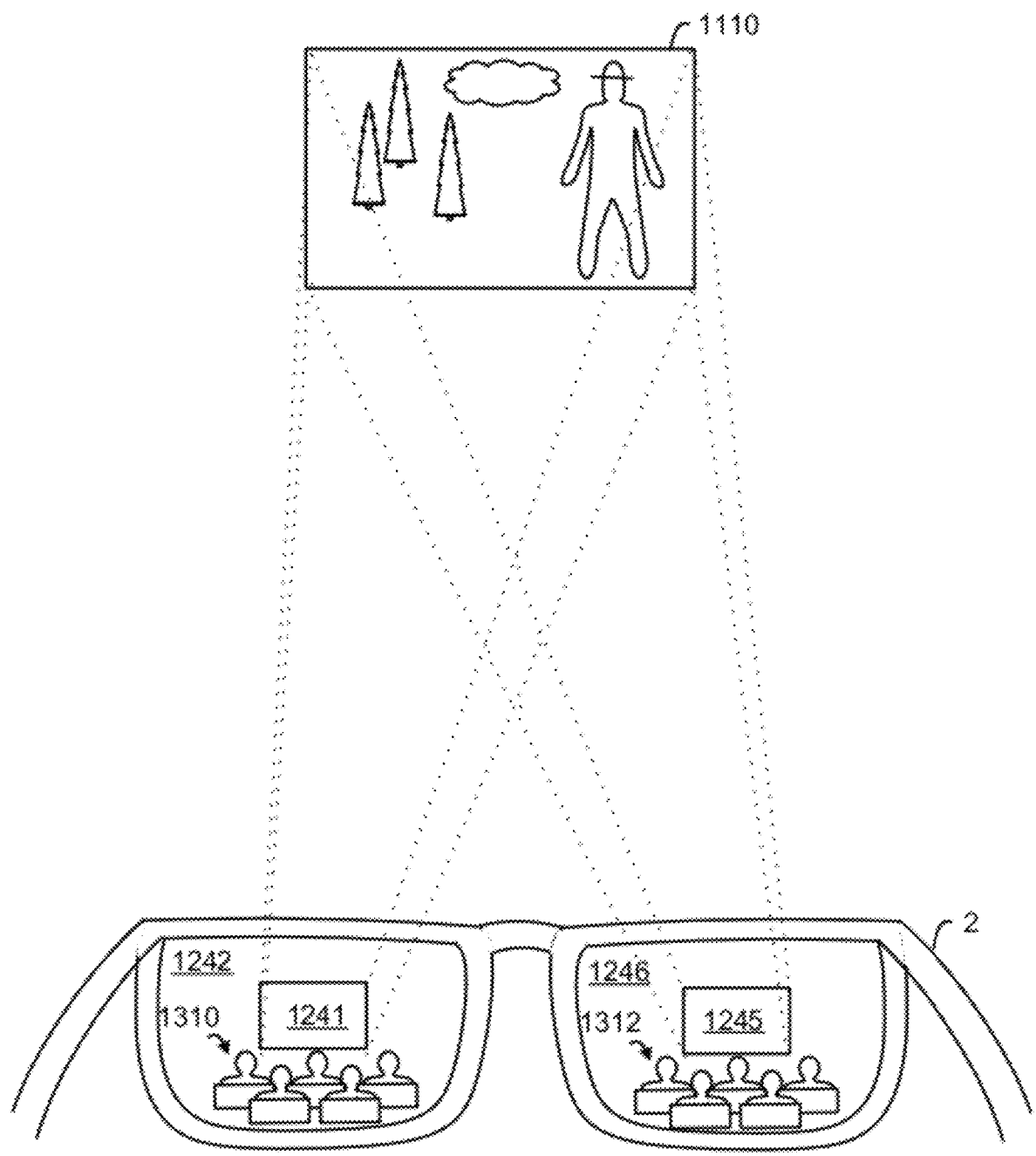

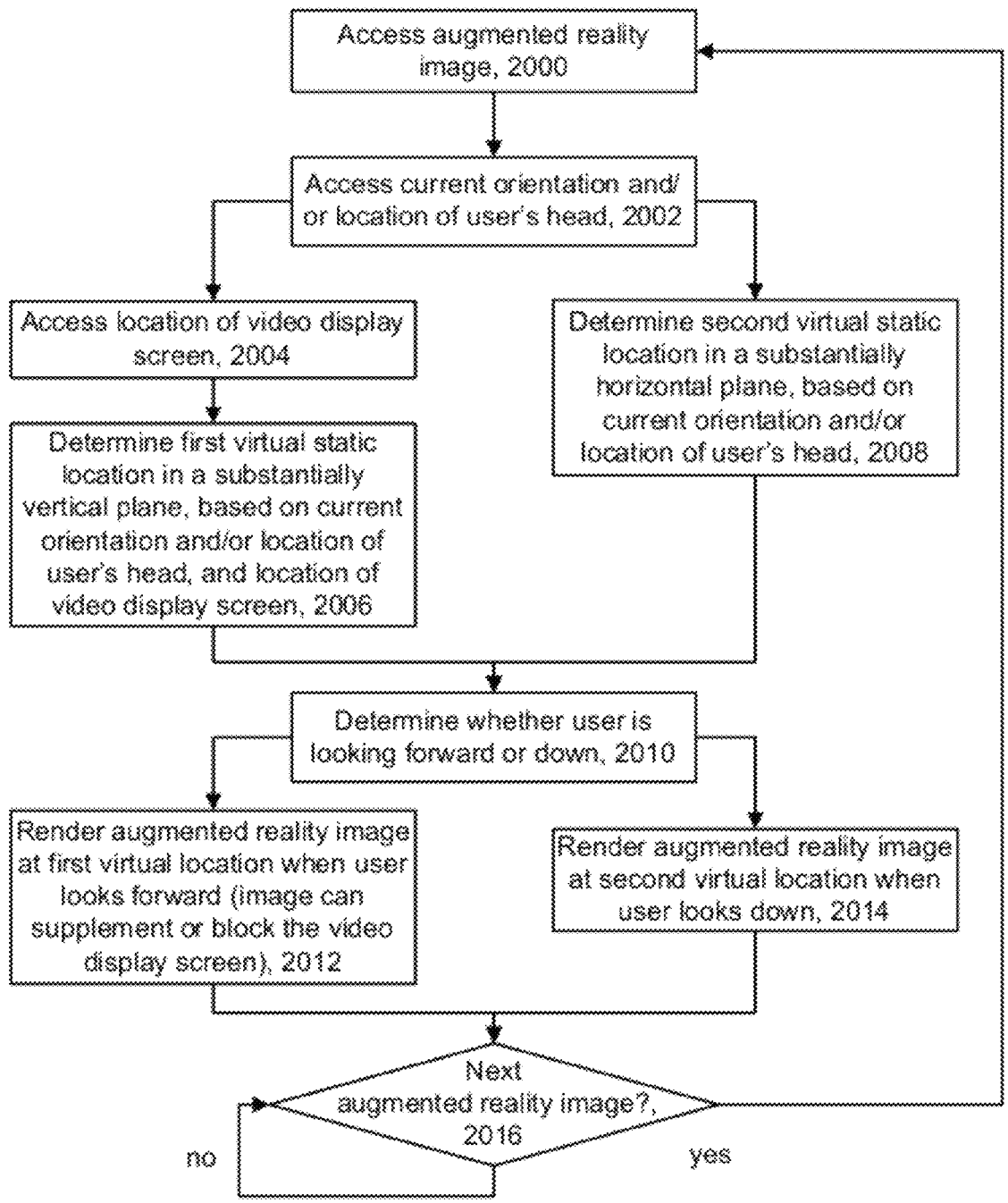

HEAD-MOUNTED DISPLAY DEVICE WHICH PROVIDES SURROUND VIDEO

BACKGROUND

Head-mounted display (HMD) devices can be used in various applications, including military, aviation, medicine, video gaming, entertainment, sports, and so forth. See-through HMD devices allow the user to observe the physical world around him or her, while optical elements add light from one or more small micro-displays into the user's visual path, to provide an augmented reality image. The augmented reality image may relate to a real-world scene which represents an environment in which a user is located. It is desirable to provide an immersive visual experience for the user.

SUMMARY

A user display apparatus is provided. The user display apparatus may include a head-mounted portion with associated electrical and optical components which provide a per-user, personalized point-of-view of augmented reality content. In one approach, the augmented reality content augments or replaces video content such as on a television or other video display screen. The augmented reality content frees the user from the constraints of the video display screen by placing sound and imagery anywhere in space, perspective-correct for each user. Each user can be presented with different information which is personalized to the user's point-of-view, context, interest and intent. In some cases, the augmented reality content is interactive based on a user's location or gesture, for instance.

In one embodiment, a user display apparatus includes a HMD device including a see-through lens. For example, the HMD device may be provided by glasses which include an augmented reality emitter which emits light to a user's eye, to provide augmented reality video images. At least one sensor is provided which tracks an orientation and location of a head of the user. A sensor such as an inertial measurement unit can be mounted on the HMD device, for instance. Optionally, an additional sensor such as a depth camera is provided separately from the HMD device, and is positioned to face the user. At least one control circuit is provided which controls the augmented reality emitter, responsive to the at least one sensor, to display the augmented reality video images. Moreover, the display can be provided in response to determining that the user is looking at the video monitor, where the augmented reality video images augment and are synchronized with content displayed by the video monitor.

For example, the augmented reality video images can be displayed in a region of space which appears to the user to be adjacent to, and extend outward from, at least one edge of the video display screen, on a common vertical plane as the video display screen, so that the augmented reality video images appear to the user as a continuation of the content displayed by the video display screen, e.g., by having a common color and/or lighting element as the content displayed by the video display screen.

In another embodiment, a 3-D image is rendered from the user's perspective, such as an object which appears to come out of the video display device and move around the room.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 7 is a block diagram depicting a multi-user system.

FIG. 8 is a flow chart describing one embodiment of a process for the hub tracking the position and orientation of a user and/or the HMD device.

FIG. 9 is a flow chart describing one embodiment of a process for tracking the position of an eye.

FIG. 10 is a flow chart describing one embodiment of a process for determining the field of view of a user.

FIG. 12A depicts a video display screen, and a region which extends from edges of the video display screen.

FIG. 12B depicts the video display screen of FIG. 12A with video content, and the region of FIG. 12A with augmented reality video which augments and is synchronized with the video content of the video display screen.

FIG. 13B depicts the images of FIG. 13A as seen via a HMD device.

FIG. 20 depicts a flowchart of a process in which augmented reality images are rendered in a static location.

DETAILED DESCRIPTION

See-through HMD devices most often use optical elements such as mirrors, prisms, and holographic lenses to add light from one or two small micro-displays into the user's visual path. An immersive visual "surround video" experience for a user can be provided using an HMD device, in conjunction with content of a video display screen. By identifying a location of the video display screen in a user's field of view, and by tracking the orientation and/or location of the user's head, augmented reality images can be rendered from a current perspective of the user, and updated in real-time as the orientation and/or location of the user's head changes. Further, the augmented reality images can be synchronized, spatially and/or temporally, with content of the video display screen. In one approach, the augmented reality images extend a size of the video display screen to provide the feeling of being in a movie theater. Optionally, the augmented reality images can provide a virtual audience to again provide the feeling of being in a movie theater. Spatialized audio of the audience can also be provided to enhance realism. Spatialized audio is sound processed to give the listener the impression of a sound source within a specific location in a three-dimensional (3-D) environment. In another approach, the augmented reality images provide a virtual object which appears to emerge outward from the video display screen and move around the room in which the user is located. The virtual object is rendered differently from a perspective of each user for greater realism. The virtual object can be synchronized with the content of the video display screen so that the virtual object is a natural extension of the content.

In another approach, the augmented reality images can be provided in a static location, apart from the video display screen, and provide information which is related or unrelated to the content of the video display screen. Related content could include a director's commentary or an actor's interview relating to a movie which is provided on the video display screen, or textual instructions such as a recipe which is demonstrated on a cooking-related television program on the video display screen. Unrelated content could include web data such as an e-mail or text messaging window, or a feed from a social networking website (e.g., TWITTER®, FACEBOOK®).

A video display screen can include a television, which is a video monitor with a tuner, or a video monitor without a tuner such as used in a computer system or other video display screen, whether stationary or mobile. For example, a larger format video display screen might be mounted to a wall in a room, or rest on a table, while a smaller format video display screen could be in a mobile device such as a laptop computer, tablet, mobile phone or the like. Further, the video display screen can be planar or curved, e.g., spherical or cylindrical.

Figure 1:
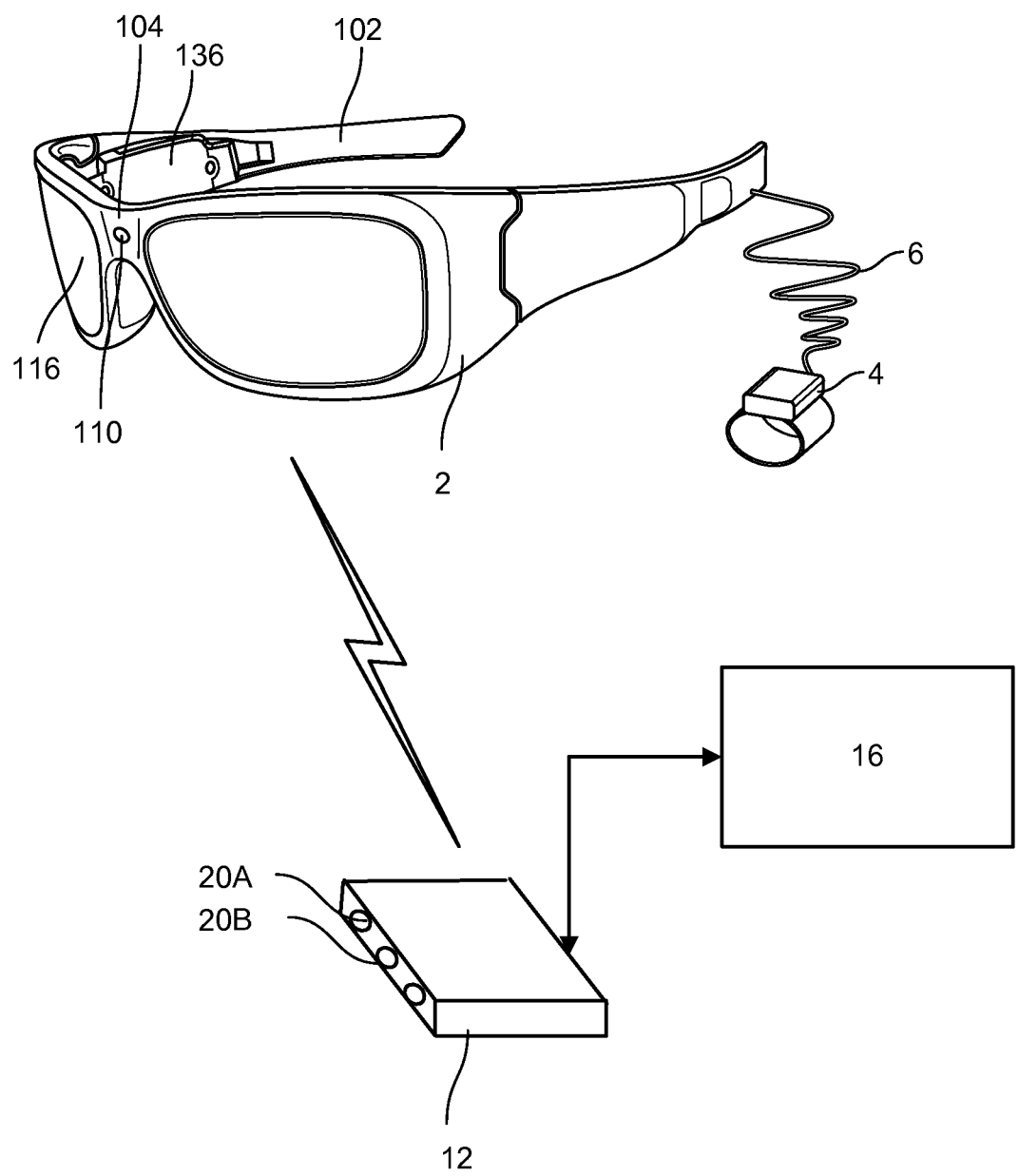
FIG. 1 is a block diagram depicting example components of one embodiment of a HMD device.

FIG. 1 is a block diagram depicting example components of one embodiment of a HMD-mounted display device. The HMD device 2 in communication with processing unit 4 via wire 6. In other embodiments, HMD device 2 communicates with processing unit 4 via wireless communication. Head-mounted display device 2, which in one embodiment is in the shape of glasses, including a frame with see-through lenses, is worn on the head of a user so that the user can see through a display and thereby see a real-world scene which includes an image which is not generated by the HMD device. More details of the HMD device 2 are provided below.

In one embodiment, processing unit 4 is worn on the user's wrist and includes much of the computing power used to operate HMD device 2. Processing unit 4 communicates wirelessly (e.g., using WIFI®, Bluetooth, infrared (e.g., IrDA or Infrared Data Association standard), or other wireless communication means) to one or more hub computing systems 12.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

Hub computing system 12 further includes one or more capture devices, such as capture devices 20A and 20B. In other embodiments, more or less than two capture devices can be used. In one example implementation, the capture devices 20A and 20B are pointed in different directions so that they capture different portions of the room. It may be advantageous that the field of view of the two capture devices slightly overlap so that hub computing system 12 can understand how the fields of view of the capture devices relate to each other. In this manner, multiple capture devices can be used to view an entire room (or other space). Alternatively, one capture device can be used if the capture device can be panned during operation so that over time the entire relevant space is viewed by the capture device.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions.

Hub computing system 12 may be connected to an audio-visual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals. According to one embodiment, the audiovisual device 16 may be connected to hub computing system 12 via, for example, an S-Video cable, a coaxial cable, an HDMI cable, a DVI cable, a VGA cable, component video cable, RCA cables, etc. In one example, audiovisual device 16 includes internal speakers. In other embodiments, audiovisual device 16, a separate stereo or hub computing system 12 is connected to external speakers.

Hub computing device 10, with capture devices 20A and 20B, may be used to recognize, analyze, and/or track human (and other types of) targets. For example, a user wearing HMD device 2 may be tracked using the capture devices 20A and 20B such that the gestures and/or movements of the user may be captured to animate an avatar or on-screen character and/or may be interpreted as controls that may be used to affect the application being executed by hub computing system 12.

A user display apparatus may be provided, e.g., by the HMD device 2 and optionally, the hub computing system 12 or other components.

Figure 2:
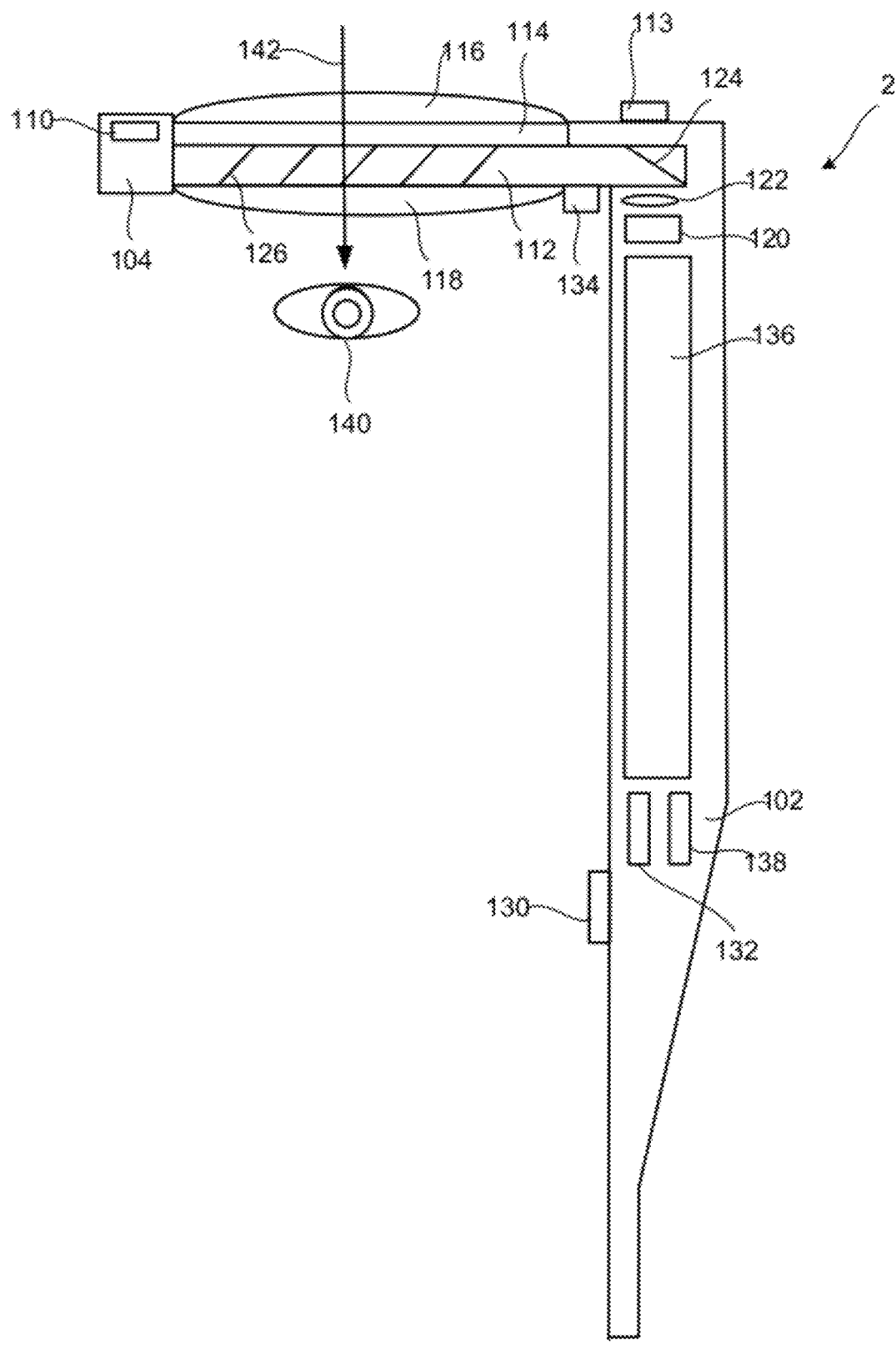
FIG. 2 is a top view of a portion of one embodiment of a HMD device.

FIG. 2 depicts a top view of a portion of HMD device 2, including a portion of the frame that includes temple 102 and nose bridge 104. Only the right side of HMD device 2 is depicted. Built into nose bridge 104 is a microphone 110 for recording sounds and transmitting that audio data to processing unit 4, as described below. At the front of HMD device 2 is room-facing video camera 113 that can capture video and still images. A room-facing depth camera could also be provided. Those images are transmitted to processing unit 4, as described below. The room-facing video camera 113 faces outward and has a viewpoint similar to that of the user.

A portion of the frame of HMD device 2 will surround a display (that includes one or more lenses). In order to show the components of HMD device 2, a portion of the frame surrounding the display is not depicted. The display includes a light guide optical element 112, opacity filter 114, see-through lens 116 and see-through lens 118. In one embodiment, opacity filter 114 is behind and aligned with see-through lens 116, light guide optical element 112 is behind and aligned with opacity filter 114, and see-through lens 118 is behind and aligned with light guide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, HMD device 2 will include only one see-through lens or no see-through lenses. In another alternative, a prescription lens can go inside light guide optical element 112. Opacity filter 114 filters out natural light (either on a per pixel basis or uniformly) to enhance the contrast of the virtual imagery. Light guide optical element 112 channels artificial light to the eye. More details of opacity filter 114 and light guide optical element 112, are provided below.

Mounted to or inside temple 102 is an image source, which (in one embodiment) includes microdisplay 120 for projecting a virtual image and lens 122 for directing images from microdisplay 120 into light guide optical element 112. In one embodiment, lens 122 is a collimating lens. An augmented reality emitter can include microdisplay 120, one or more optical components such as the lens 122 and light guide 112, and associated electronics such as a driver. Such an augmented reality emitter is associated with the HMD device, and emits light to a user's eye, where the light represents augmented reality video images.

Control circuits 136 provide various electronics that support the other components of HMD device 2. More details of control circuits 136 are provided below with respect to FIG. 3. Inside, or mounted to temple 102, are ear phones 130, inertial sensors 132 and temperature sensor 138. In one embodiment, inertial sensors 132 include a three axis magnetometer 132A, three axis gyro 132B and three axis accelerometer 132C (See FIG. 3). The inertial sensors are for sensing position, orientation, sudden accelerations of HMD device 2. For example, the inertial sensors can be one or more sensors which are used to determine an orientation and/or location of user's head, Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DGP), liquid crystal on silicon (LCOS) and MIRASOL® (a display technology from QUALCOMM, INC.) are all examples of reflective technologies which are efficient as most energy is reflected away from the modulated structure. Additionally, microdisplay 120 can be implemented using an emissive technology where light is generated by the display. For example, a PicoP™-display engine (available from MICROVISION, INC.) emits a laser signal with a micro mirror steering either onto a tiny screen that acts as a transmissive element or beamed directly into the eye (e.g., laser).

Light guide optical element 112 transmits light from microdisplay 120 to the eye 140 of the user wearing HMD device 2. Light guide optical element 112 also allows light from in front of the HMD device 2 to be transmitted through light guide optical element 112 to eye 140, as depicted by arrow 142, thereby allowing the user to have an actual direct view of the space in front of HMD device 2 in addition to receiving a virtual image from microdisplay 120. Thus, the walls of light guide optical element 112 are see-through. Light guide optical element 112 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar, substrate comprising light guide optical element 112 by internal reflection. After several reflections off the surfaces of the substrate, the trapped light waves reach an array of selectively reflecting surfaces 126. Note that only one of the five surfaces is labeled 126 to prevent over-crowding of the drawing.

Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light guide optical element can be found in U.S. Patent Application Publication 2008/0285140, Ser. No. 12/214,366, published on Nov. 20, 2008, incorporated herein by reference in its entirety. In one embodiment, each eye will have its own light guide optical element 112. When the MID device has two light guide optical elements, each eye can have its own microdisplay 120 that can display the same image in both eyes or different images in the two eyes. In another embodiment, there can be one light guide optical element which reflects light into both eyes.

Opacity filter 114, which is aligned with light guide optical element 112, selectively blocks natural light, either uniformly or on a per-pixel basis, from passing through light guide optical element 112. In one embodiment, the opacity filter can be a see-through LCD panel, electrochromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 90% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below.

A mask of alpha values can be used from a rendering pipeline, after z-buffering with proxies for real-world objects. When the system renders a scene for the augmented reality display, it takes note of which real-world objects are in front of which virtual objects. If a virtual object is in front of a real-world object, then the opacity should be on for the coverage area of the virtual object. If the virtual is (virtually) behind a real-world object, then the opacity should be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide field of view. More details of an opacity filter are provided in U.S. patent application Ser. No. 12/887,426, "Opacity Filter For See-Through Mounted Display," filed on Sep. 21, 2010, incorporated herein by reference in its entirety.

An opacity filter such as an LCD has generally not been used with a see-through lens as described herein because at this near distance to the eye it can be out of focus. However, in some cases, this result can be desirable. A user sees the virtual image with crisp color graphics via the normal HMD device using additive color, which is designed to be in focus. The LCD panel is placed "behind" this display such that a fuzzy black border surrounds any virtual content, making it as opaque as desired. The system converts the flaw of natural blurring to expediently obtain the feature of anti-aliasing and bandwidth reduction. These are a natural result of using a lower-resolution and out-of-focus image. There is an effective smoothing of the digitally-sampled image. Any digital image is subject to aliasing, where the discrete nature of the sampling causes errors against the naturally analog and continuous signal, around the wavelengths of light. Smoothing means visually closer to the ideal analog signal. Although information lost to the low resolution is not recovered, the resulting errors are less noticeable.

In one embodiment, the display and the opacity filter are rendered simultaneously and are calibrated to a user's precise position in space to compensate for angle-offset issues. Eye tracking (e.g., using eye tracking camera 134) can be employed to compute the correct image offset at the extremities of the viewing field.

In one example approach, an increased opacity is provided for the pixels of the opacity filter which are behind the virtual image, from the perspective of the identified location of the user's eye. In this manner, the pixels behind the virtual image are darkened so that light from a corresponding portion of the real world scene is blocked from reaching the user's eyes. This allows the virtual image to be realistic and represent a full range of colors and intensities. Moreover, power consumption by the augmented reality emitter is reduced since the virtual image can be provided at a lower intensity. Without the opacity filter, the virtual image would need to be provided at a sufficiently high intensity which is brighter than the corresponding portion of the real world scene, for the virtual image to be distinct and not transparent. In darkening the pixels of the opacity filter, generally, the pixels which follow the closed perimeter of virtual image are darkened, along with pixels within the perimeter. It can be desirable to provide some overlap so that some pixels which are just outside the perimeter and surround the perimeter are also darkened (at the same level of darkness or less dark than pixels inside the perimeter). These pixels just outside the perimeter can provide a fade (e.g., a gradual transition in opacity) from the darkness inside the perimeter to full amount of opacity outside the perimeter.

Figure 2A:
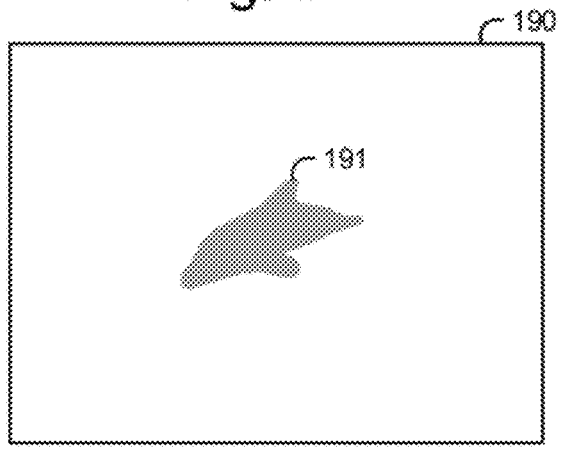
FIG. 2A depicts an example configuration of an opacity filter based on a shape of an augmented reality image.

FIG. 2A depicts an example configuration of an opacity filter based on a shape of an augmented reality image, which is a dolphin in this example. The opacity filter 190 provides a region 191 of increased opacity. An increased opacity generally refers to a darkening of pixels which can include a darkening to different grey levels in a monochrome scheme, or a darkening to different color levels in a color scheme.

Figure 2B:
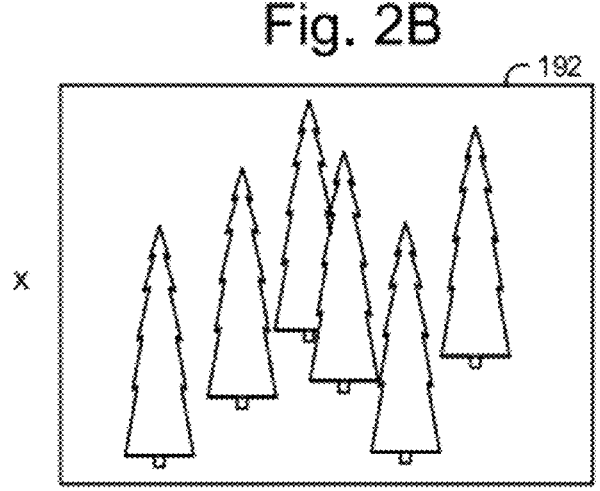
FIG. 2B depicts an example real-world scene.

FIG. 2B depicts an example real-world scene 192. The real-world scene could be actual trees which a user is viewing, or an electronically-rendered image of trees such as on a video display screen. When light from the real-world scene 192 passes through the opacity filter, the light is multiplied by the opacity filter 190 such that increased-opacity area multiplies the corresponding area of the real-world scene by a "0," so that the corresponding area of the real-world scene is not transmitted through the opacity filter, while the non-darkened area multiplies the corresponding area of the real-world scene by a "1," so that the corresponding area of the real-world scene is transmitted through the opacity filter.

Figure 2C:
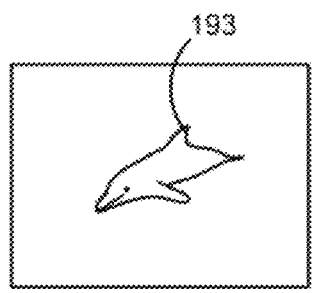
FIG. 2C depicts an augmented reality image which corresponds to the configuration of the opacity filter of FIG. 2A.

FIG. 2C depicts an augmented reality image which corresponds to the configuration of the opacity filter of FIG. 2A. The augmented reality image 193 can be rendered with colors and textures which are not depicted in this example.

Figure 2D:
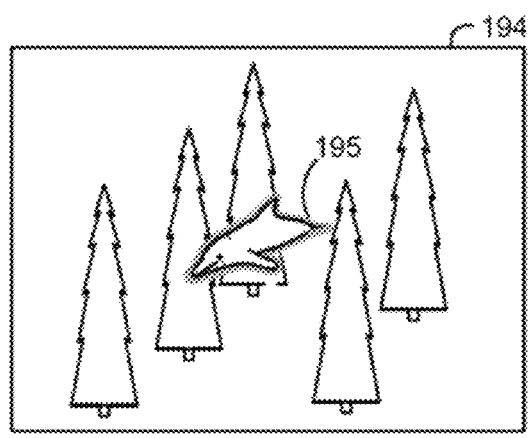
FIG. 2D depicts an example mixed-reality image which is seen by a user.

FIG. 2D depicts an example mixed-reality image which is seen by a user. The image 194 is formed by adding the image 193 to an image which is formed by multiplying the images 190 and 192. A darkened region 195 can surround the augmented reality image of the dolphin to enhance the distinctiveness of the augmented reality image.

Figure 3:
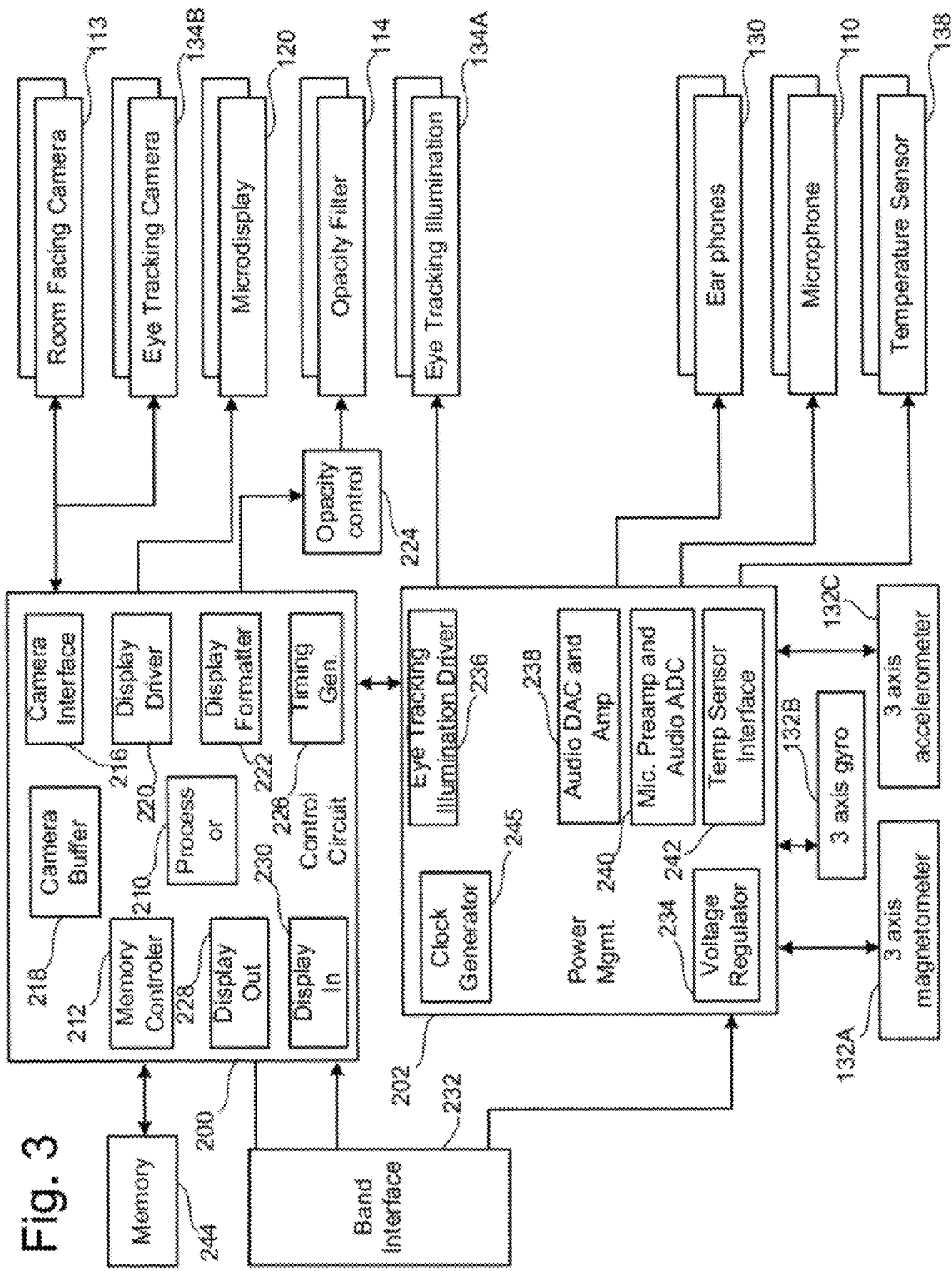
FIG. 3 is a block diagram of one embodiment of the components of a HMD device.
Figure 4:
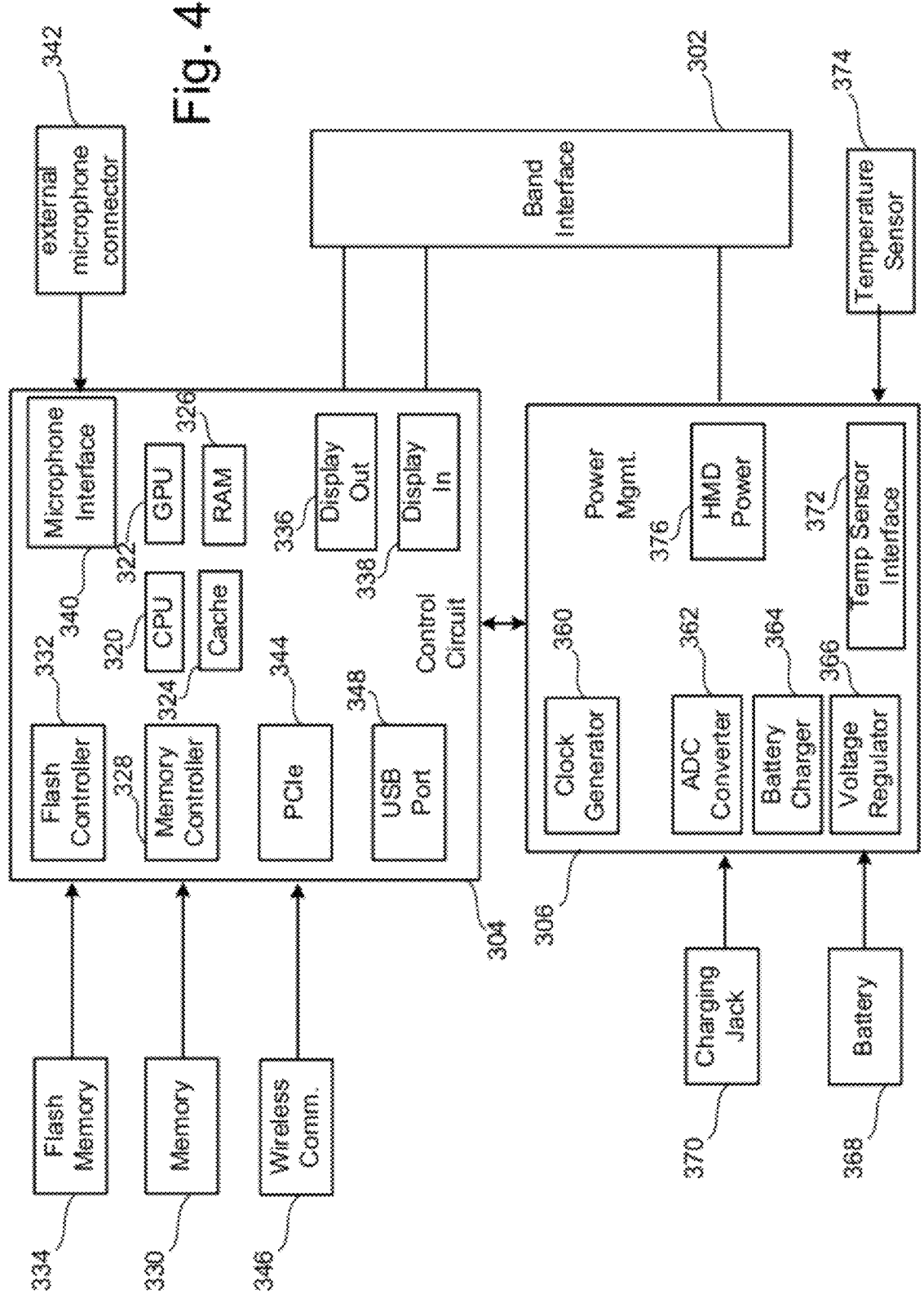
FIG. 4 is a block diagram of one embodiment of the components of a processing unit associated with a HMD device.

FIG. 3 is a block diagram depicting the various components of HMD device 2. FIG. 4 is a block diagram describing the various components of processing unit 4. Dead mounted display device 12, the components of which are depicted in FIG. 3, are used to provide the virtual image to the user by fusing that virtual image with the user's view of the real world. Additionally, the HMD device components of FIG. 3 include many sensors that track various conditions. Head-mounted display device will receive instructions about the virtual image from processing unit 4 and will provide the sensor information back to processing unit 4. Processing unit 4, the components of which are depicted in FIG. 3, will receive the sensory information from HMD device 2 and also from hub computing device 12 (See FIG. 1). Based on that information, processing unit 4 will determine where and when to provide a virtual image to the user and send instructions accordingly to the HMD device of FIG. 3.

Note that some of the components of FIG. 3 (e.g., room facing camera 113, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of HMD device. Regarding the room-facing camera 113, in one approach one camera is used to obtain images using visible light. These images can be used to identify the location of a video display screen in a room using machine vision techniques. In another approach, two or more cameras with a known spacing between them are used as a depth camera to also obtain depth data for objects in a room, indicating the distance from the cameras/HMD device to the object. The cameras of the HMD device can essentially duplicate the functionality of the depth camera provided by the computer hub 12 (see also capture device 20A of FIG. 5).

FIG. 3 shows the control circuit 200 in communication with the power management circuit 202. Control circuit 200 includes processor 210, memory controller 212 in communication with memory 244 (e.g., DRAM), camera interface 216, camera buffer 218, display driver 220, display formatter 222, timing generator 226, display out interface 228, and display in interface 230. In one embodiment, all of components of control circuit 200 are in communication with each other via dedicated lines or one or more buses. In another embodiment, each of the components of control circuit 200 is in communication with processor 210. Camera interface 216 provides an interface to the two room facing cameras 112 and stores images received from the room facing cameras in camera buffer 218. Display driver 220 drives microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room facing cameras 112 to the processing unit 4. Display in 230 is a buffer for receiving images such as a virtual image to be displayed on microdisplay 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier audio ADC 240, temperature sensor interface 242 and clock generator 245. Voltage regulator 234 receives power from processing unit 4 via band interface 232 and provides that power to the other components of HMD device 2. Eye tracking illumination driver 236 provides the infrared (IR) light source for eye tracking illumination 134A, as described above. Audio DAC and amplifier 238 receives the audio information from earphones 130. Microphone preamplifier and audio ADC 240 provides an interface for microphone 110. Temperature sensor interface 242 is an interface for temperature sensor 138. Power management unit 202 also provides power and receives data back from three-axis magnetometer 132A, three-axis gyroscope 132B and three axis accelerometer 132C.

FIG. 4 is a block diagram describing the various components of processing unit 4. Control circuit 304 is in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with HMD device 2 via band interface 302 and band interface 232, display in buffer 338 in communication with HMD device 2 via band interface 302 and band interface 232, microphone interface 340 in communication with an external microphone connector 342 for connecting to a microphone, PCI express interface 344 for connecting to a wireless communication device 346, and USB port(s) 348.

In one embodiment, wireless communication component 346 can include a WIFI® enabled communication device, Bluetooth communication device, infrared communication device, etc. The wireless communication component 346 is a wireless communication interface which, in one implementation, receives data in synchronism with the content displayed by the video display screen 16. Further, augmented reality video images may be displayed in response to the received data. In one approach, such data is received from the hub computing system 12.

The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to insert virtual images into the view of the user. More details are provided below.

Power management circuit 306 includes clock generator 360, analog to digital converter 362, battery charger 364, voltage regulator 366, HMD power source 376, and temperature sensor interface 372 in communication with temperature sensor 374 (located on the wrist band of processing unit 4). Analog to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power source 376 provides power to the HMD device 2.

The above-described system can be configured to insert a virtual image into the field of view of a user so that the virtual image replaces the view of a real world object. Alternatively, the virtual image can be inserted without replacing the image of a real world object. In various embodiments, the virtual image will be adjusted to match the appropriate orientation, size and shape based on the object being replaced or the environment for which the image is being inserted into. In addition, the virtual image can be adjusted to include reflectivity and shadows. In one embodiment, HMD device 12, processing unit 4 and hub computing device 12 work together as each of the devices includes a subset of sensors that are used to obtain the data for determining where, when and how to insert the virtual images. In one embodiment, the calculations that determine where, how and when to insert a virtual image and performed by the hub computing device 12. In another embodiment, those calculations are performed by processing unit 4. In another embodiment some of the calculations are performed by hub computing device 12 while other calculations are performed by processing unit 4. In other embodiments, the calculations can be performed by HMD device 12.

In one example embodiment, hub computing device 12 will create a model of the environment that the user is in and track various moving objects in that environment. In addition, hub computing device 12 tracks the field of view of the HMD device 2 by tracking the position and orientation of HMD device 2. The model and the tracking information are provided from hub computing device 12 to processing unit 4. Sensor information obtained by HMD device 2 is transmitted to processing unit 4. Processing unit 4 then uses additional sensor information it receives from HMD device 2 to refine the field of view of the user and provide instructions to HMD device 2 on how, where and when to insert the virtual image.

Figure 5:
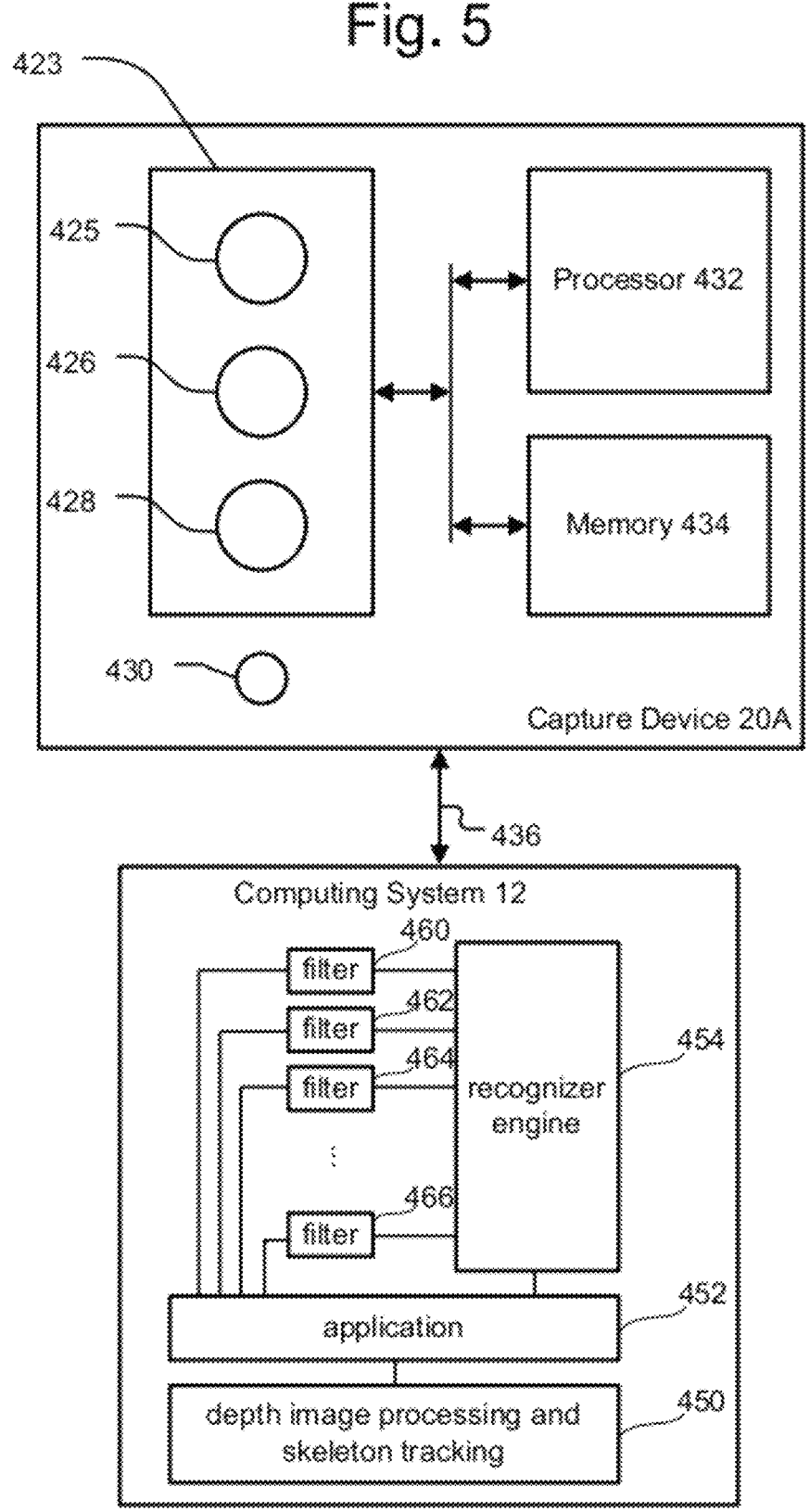
FIG. 5 is a block diagram of one embodiment of the components of a hub computing system used with a HMD device.

FIG. 5 illustrates an example embodiment of hub computing system 12 with a capture device. In one embodiment, capture devices 20A and 20B are the same structure, therefore, FIG. 5 only shows capture device 20A.

According to an example embodiment, capture device 20A may be configured to capture video with depth information including a depth image that may include depth values via any suitable technique including, for example, time-of-flight, structured light, stereo image, or the like. According to one embodiment, the capture device 20A may organize the depth information into "Z layers," or layers that may be perpendicular to a Z axis extending from the depth camera along its line of sight.

Capture device 20A may include a camera component 423, which may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infrared (IR) light component 425, an infrared camera 426, and an RGB (visual image) camera 428 that may be used to capture the depth image of a scene. A 3-D camera is formed by the combination of the infrared emitter 24 and the infrared camera 26. For example, in time-of-flight analysis, the IR light component 425 of the capture device 20A may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 20A to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20A to a particular location on the targets or objects by analyzing the intensity of the reflected beam of light over time via various techniques including, for example, shuttered light pulse imaging.

In another example embodiment, capture device 20A may use a structured light to capture depth information. In such an analysis, patterned light (i.e., light displayed as a known pattern such as grid pattern, a stripe pattern, or different pattern) may be projected onto the scene via, for example, the IR light component 425. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR light component 425 is displaced from the cameras 425 and 426 so triangulation can be used to determined distance from cameras 425 and 426. In some implementations, the capture device 20A will include a dedicated IR sensor to sense the IR light, or a sensor with an IR filter.

According to another embodiment, the capture device 20A may include two or more physically separated cameras that may view a scene from different angles to obtain visual stereo data that may be resolved to generate depth information. Other types of depth image sensors can also be used to create a depth image.

The capture device 20A may further include a microphone 430, which includes a transducer or sensor that may receive and convert sound into an electrical signal. Microphone 430 may be used to receive audio signals that may also be provided by hub computing system 12.

In an example embodiment, the capture device 20A may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20A may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 5, in one embodiment, memory 434 may be a separate component in communication with the image capture component 423 and processor 432. According to another embodiment, the memory 434 may be integrated into processor 432 and/or the image capture component 423.

Capture devices 20A and 20B are in communication with hub computing system 12 via a communication link 436. The communication link 436 may be a wired connection including, for example, a USB connection, a FireWire connection, an Ethernet cable connection, or the like and/or a wireless connection such as a wireless 802.11b, g, a, or n connection. According to one embodiment, hub computing system 12 may provide a clock to capture device 20A that may be used to determine when to capture, for example, a scene via the communication link 436. Additionally, the capture device 20A provides the depth information and visual (e.g., RGB or other color) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 includes depth image processing and skeletal tracking module 450, which uses the depth images to track one or more persons detectable by the depth camera function of capture device 20A. Depth image processing and skeletal tracking module 450 provides the tracking information to application 452, which can be a video game, productivity application, communications application or other software application etc. The audio data and visual image data is also provided to application 452 and depth image processing and skeletal tracking module 450. Application 452 provides the tracking information, audio data and visual image data to recognizer engine 454. In another embodiment, recognizer engine 454 receives the tracking information directly from depth image processing and skeletal tracking module 450 and receives the audio data and visual image data directly from capture devices 20A and 20B.

Recognizer engine 454 is associated with a collection of filters 460, 462, 464, . . . , 466 each comprising information concerning a gesture, action or condition that may be performed by any person or object detectable by capture device 20A or 20B. For example, the data from capture device 20A may be processed by filters 460, 462, 464, . . . , 466 to identify when a user or group of users has performed one or more gestures or other actions. Those gestures may be associated with various controls, objects or conditions of application 452. Thus, hub computing system 12 may use the recognizer engine 454, with the filters, to interpret and track movement of objects (including people).

Capture devices 20A and 20B provide RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009 to Craig et al. (hereinafter referred to as the '437 Application), incorporated herein by reference in its entirety. The process of the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. patent applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 454 includes multiple filters 460, 462, 464, . . . , 466 to determine a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time. In one approach, a user performs a gesture which affects the movement of a virtual 3-D object, such as "swatting away" the object to cause it to move away from the user.

Filters may be modular or interchangeable. In one embodiment, a filter has a number of inputs (each of those inputs having a type) and a number of outputs (each of those outputs having a type). A first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter— perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

Recognizer engine 454 may have a base recognizer engine that provides functionality to the filters. In one embodiment, the functionality that recognizer engine 454 implements includes an input-over-time archive that tracks recognized gestures and other input, a Hidden Markov Model implementation (where the modeled system is assumed to be a Markov process—one where a present state encapsulates any past state information used to determine a future state, so no other past state information must be maintained for this purpose— with unknown parameters, and hidden parameters are determined from the observable data), as well as other functionality used to solve particular instances of gesture recognition.

Filters 460, 462, 464, ..., 466 are loaded and implemented on top of the recognizer engine 454 and can utilize services provided by recognizer engine 454 to all filters 460, 462, 464, ..., 466. In one embodiment, recognizer engine 454 receives data to determine whether it meets the requirements of any filter 460, 462, 464, 466. Since these provided services, such as parsing the input, are provided once by recognizer engine 454 rather than by each filter 460, 462, 464, ..., 466, such a service can only be processed once in a period of time as opposed to once per filter for that period, so the processing used to determine gestures is reduced.

Application 452 may use the filters 460, 462, 464, ..., 466 provided with the recognizer engine 454, or it may provide its own filter, which plugs in to recognizer engine 454. In one embodiment, all filters have a common interface to enable this plug-in characteristic. Further, all filters may utilize parameters, so a single gesture tool below may be used to debug and tune the entire filter system.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. 2010/0194762, "Standard Gestures," published Aug. 5, 2010, and U.S. patent application Ser. No. 12/474,655, "Gesture Tool" filed on May 29, 2009, both of which are incorporated herein by reference in their entirety.

Figure 6:
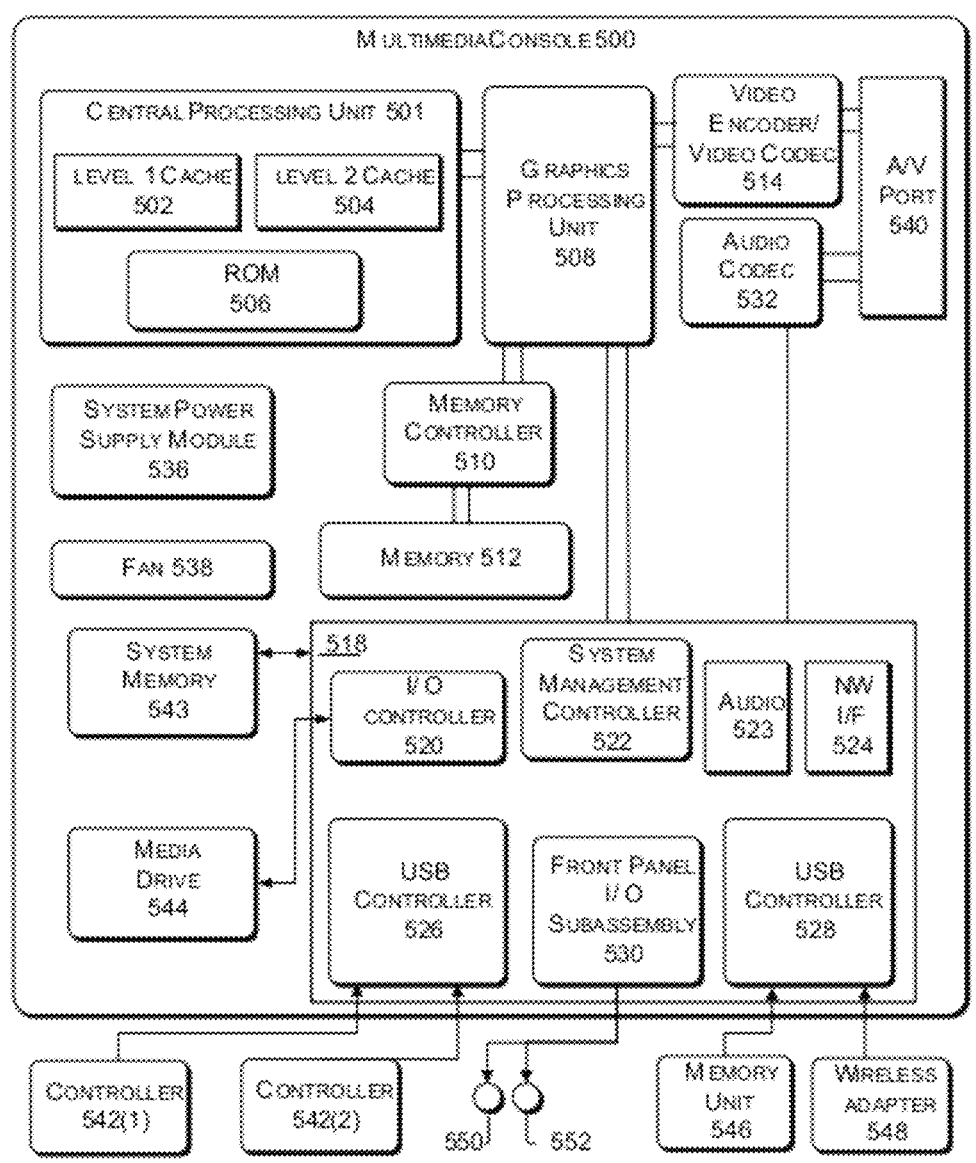
FIG. 6 is a block diagram of one embodiment of a computing system that can be used to implement the hub computing system described herein.

FIG. 6 illustrates an example embodiment of a computing system that may be used to implement hub computing system 12. As shown in FIG. 6, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394 serial bus interface).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. Such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render a popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaining application due to time sensitivity. A multimedia console application manager controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture devices 20A and 20B may define additional input devices for the console 500 via USB controller 526 or other interface. In other embodiments, hub computing system 12 can be implemented using other hardware architectures. No one hardware architecture is required.

FIG. 1, discussed previously, depicts one HMD device 2 and processing unit 4 (collectively referred to as a mobile display device) in communication with one hub computing device 12 (referred to as a hub). In another embodiment, multiple mobile display devices can be in communication with a single hub. Each of the mobile display devices will communicate with the hub using wireless communication, as described above. In such an embodiment, it is contemplated that much of the information that is useful to all of the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

In another embodiment, a system could include multiple hubs, with each hub including one or more mobile display devices. The hubs can communicate with each other directly or via the Internet (or other networks). For example, FIG. 7 shows hubs 560, 562 and 564. Hub 560 communicates directly to hub 562. Hub 560 communicates to hub 564 via the Internet. Hub 560 communicated with mobile display devices 570, 572, . . . , 574. Hub 562 communicates with mobile display devices 578, 580, . . . , 582. Hub 564 communicates with mobile display devices 584, 586, . . . , 588. Each of the mobile display devices communicate with their respective hub via wireless communication as discussed above. If these hubs are in a common environment, then each of the hubs can provide a portion of the model of the environments, or one hub can create the model for the other hubs. Each of the hubs will track a subset of moving objects and share that information with the other hubs, which will in turn share the information with the appropriate mobile display devices. Sensor information for the mobile display devices will be provided to their respective hubs and then shared to the other hubs for eventual sharing to the other mobile display devices. Thus, information shared between hubs can include skeleton tracking, information about the models, various states of applications, and other tracking. The information communicated between the hubs and their respective mobile display devices include tracking information of moving objects, the state and physics updates for the world models, geometry and texture information, video and audio, and other information used to perform the operations described herein.

At least one control circuit can be provided, e.g., by the hub computing system 12, processing unit 4, processor 210, CPU 320, GPU 322, processor 432 and/or console 500. The at least one control circuit may execute instructions stored on a tangible, non-transistor processor-readable storage device for achieving the functionality described herein. The storage device, as a computer-readable media, can be provided, e.g., by memory 244, cache 324, RAM 326, flash memory 334, memory 330, memory 434, memory 512, cache 502 or 504, memory 543, and/or memory unit 546.

A hub can also communicate data, e.g., wirelessly, to a HMD device for rendering an augmented reality image from a perspective of the user, based on a current orientation and/or location of the user's head which is transmitted to the hub. The data for rendering the augmented reality image can be in synchronism with content displayed on a video display screen. In one approach, the data for rendering the augmented reality image includes image data for controlling pixels of the augmented reality display to provide an augmented reality image in a specified virtual location such as adjacent to the video display screen, or at another static location relative to the video display screen, or at a static location which is not defined relative to the video display screen. The augmented reality image can include a 3-D object as discussed further below which is rendered from the user's current perspective. Such a 3-D object can appear to come out of the video display screen, move around the room and return to the video display screen. The image data for controlling pixels of the augmented reality display can be in a specified file format, for instance, where individual frames of images are specified.

Furthermore, the hub can communicate data to the HMD device for rendering an augmented reality image in temporal synchronicity with the content which is displayed on a video display screen. In one approach, the data includes timing data which instructs the HMD device to render an image at a specified time. Clocks of the hub and the HMD device are synchronized for this purpose such as by using time codes. This communication by the hub can be in addition to the image data for rendering the augmented reality image. In another approach, the image data for rendering the augmented reality image is obtained from another source than the hub, such as via a local storage device which is included with the HMD or perhaps carried by the user's person, e.g., in a pocket or arm band, and connected to the head-mounted via a wire or wirelessly.

FIG. 10 is a flowchart describing one embodiment of a process for determining the field of view a user. The process of FIG. 10 relies on information from the hub computing device 12 and the eye tracking technology described above. FIG. 8 is a flowchart describing one embodiment of a process performed by the hub computing system to provide tracking information used in the process of FIG. 10. FIG. 9 is a flowchart describing one embodiment of a process for tracking an eye, the results of which are used by the process of FIG. 10.

In step 810 of FIG. 8, hub computing device will track the user's position. For example, hub computing device 12 will use one or more depth images and one or more visual images to track a user (e.g., using skeleton tracking). One or more depth images and one or more visual images can be used to determine the position of the HMD device 2 and the orientation of the MID device 2 in step 812. In step 814, the position and orientation of the user and the HMD device 2 are transmitted from the hub computing device 12 to processing unit 4. In step 816, the position and orientation information is received at processing unit 4. Alternatively, or additionally, one or more sensors such as inertial sensors carried by the HMD device can be used to track the orientation and/or location of the user's head. User location could also be tracked by using triangulation of RF signals involving three or more locations, where one location is on the HMD device, and the other two locations are at known positions in the room, e.g., on the hub or elsewhere.

FIG. 9 is a flowchart describing one embodiment for tracking an eye using the technology described above. In step 860, the eye is illuminated. For example, the eye can be illuminated using infrared light from eye tracking illumination 134A. In step 862, the reflection from the eye is detected using one or more eye tracking cameras 134B. In step 864, the reflection data is sent from HMD device 2 to processing unit 4. In step 866, processing unit 4 will determine the position of the eye based on the reflection data, as discussed above.

FIG. 10 is a flowchart describing one embodiment of a process for determining the field of view. In step 902, processing unit 4 will access the latest position and orientation information received from the hub. The process of FIG. 8 can be performed continuously as depicted by the arrow from step 814 to step 810, therefore, processing unit 4 will periodically receive updated position and orientation information from hub computing device 12. However, processing unit 4 will draw the virtual image more frequently than it receives the updated information from hub computing device 12. Therefore, processing unit 4 will rely on information sensed locally (e.g., from the head-mounted device 2) to provide updates to the orientation in between samples from hub computing device 12. In step 904, processing unit 4 will access data from three axis gyro 132B. In step 906, processing unit 4 will access data from three axis accelerometer 132C. In step 908, processing unit 4 will access data from three axis magnetometer 132A. In step 910, processing unit 4 will refine (or otherwise update), the position and orientation data from hub computing device 12 with the data from the gyro, accelerometer and magnetometer. In step 912, processing unit 4 will determine the potential field of view based on the location and orientation of HMD device. In step 914, processing unit 4 will access the latest eye position information. In step 916, processing unit 4 will determine portion of model being viewed by user, as a subset of the potential field of view, based on eye position. For example, the user may be facing a wall and, therefore, the field of the view for the HMD device could include anywhere along the wall. However, if the user's eyes are pointed to the right, then step 916 will conclude that the field of view of the user is only the right hand portion of the wall. At the conclusion of step 916, processing unit 4 has determined the field of view of the user through HMD device 2. Then, processing unit 4 can identify a location within that field of view, e.g., to insert a virtual image and block light using the opacity filter.

The eye position is optionally used to determine the field of view or perspective of the user. In one approach, the eye position is not used, and the field of view or perspective of the user is based on the orientation and/or location of the user's head.

Figure 11A:
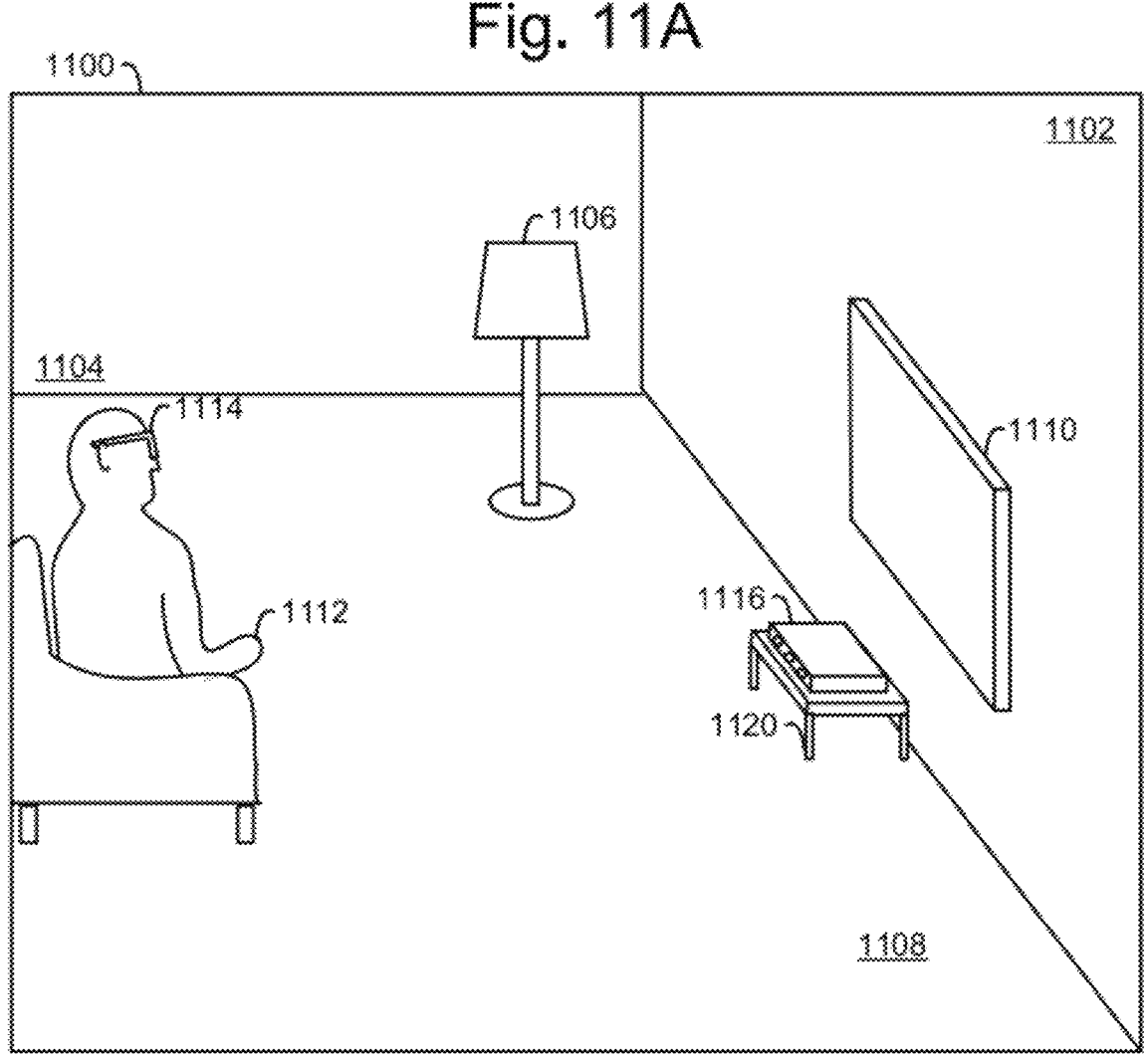
FIG. 11A depicts an environment in which a user watches a video display screen using a HMD device.

FIG. 11A depicts an environment in which a user watches a video display screen using a HMD device. A scene 1100 is depicted in which a user 1112 is in a room which is a typical environment or space in which a HMD device 1114 can be used. The room includes a front wall 1102, side wall 1104 and floor 1108, and example furniture such as a lamp 1106 and table 1120. A video display screen 1110 is mounted to the wall 1102, in this example, and the hub 1116 rests on the table 1120

Figure 11B:
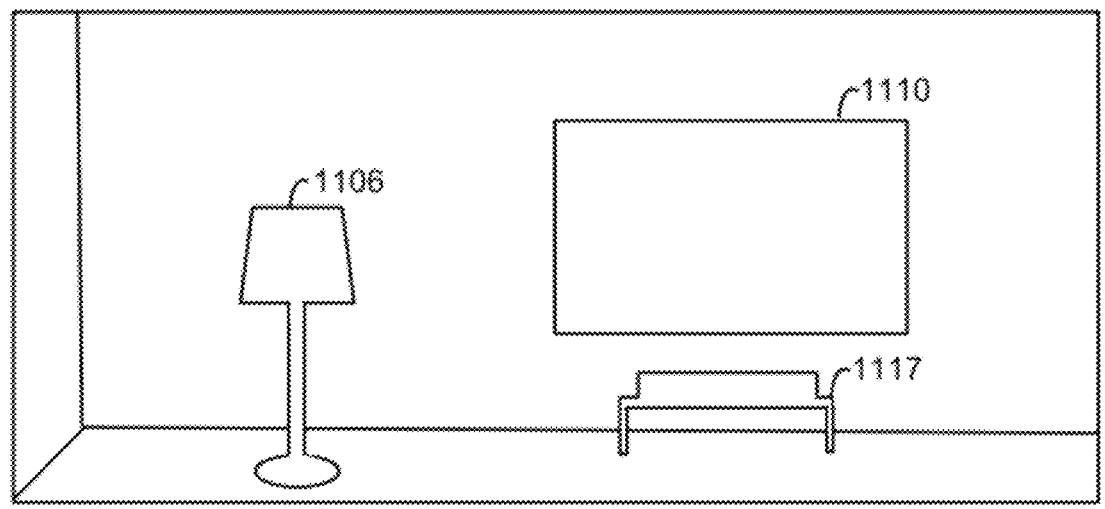
FIG. 11B depicts a view of a camera of the HMD device of FIG. 11A, where outlines of objects are identified.
Figure 14A:
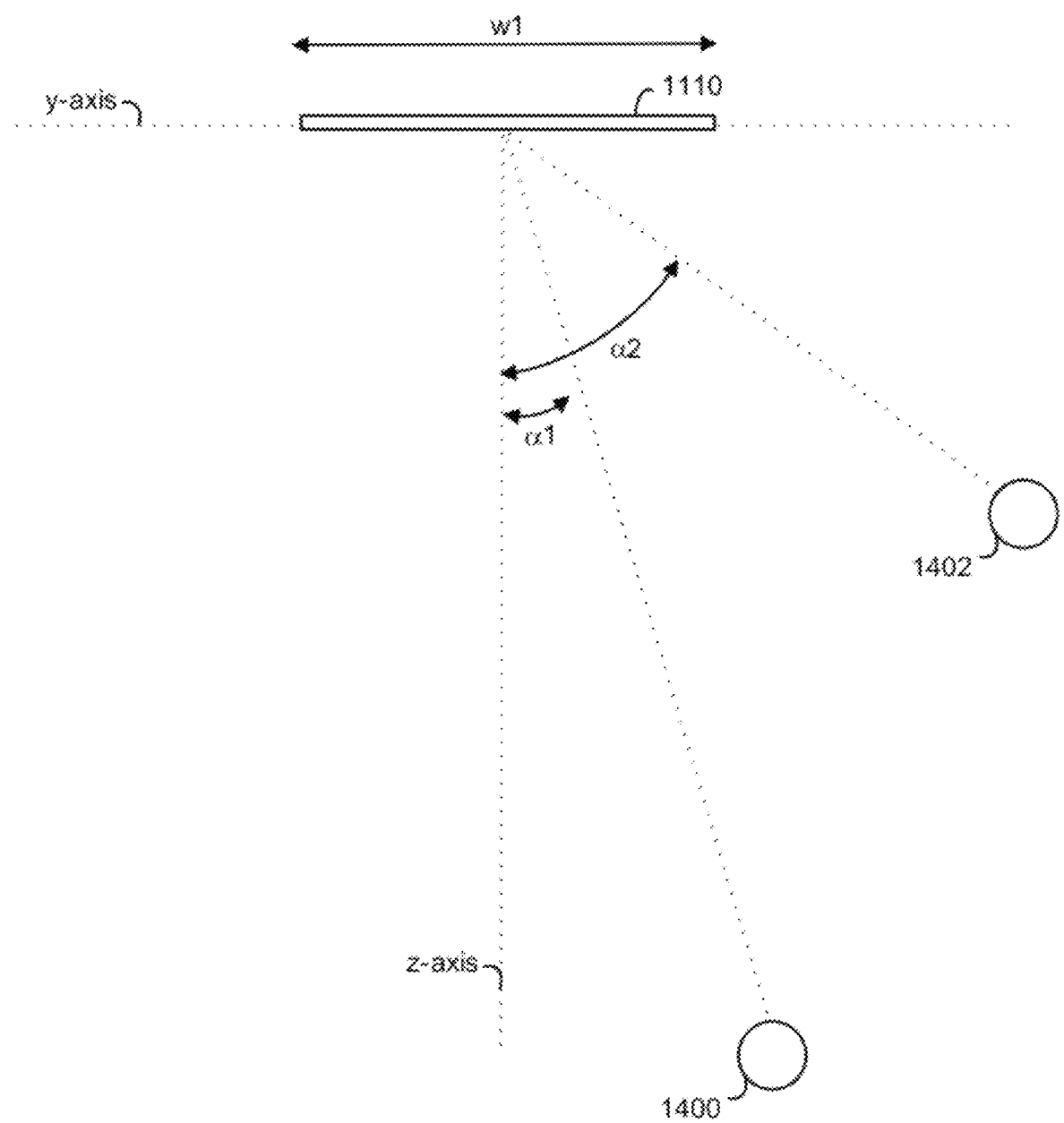
FIG. 14A depicts different perspectives and locations of different users relative to a video display screen.

FIG. 11B depicts a view of a camera of the HMD device of FIG. 11A, where outlines of objects are identified. In one approach, the location of the video display screen 1110 is identified using the front-facing camera on the HMD device. For example, the camera can sense visible light to obtain an image which is processed using machine vision techniques to recognize the outlined shapes of objects in the field of view of the camera. Here, outlined shapes which represent the lamp 1106, video display screen 1110 and hub/table 1117 are depicted. The video display screen can be recognized by characteristics such as its expected shape, e.g., rectangular. Other characteristics could also be used such as an expected greater light intensity which is seen at the location of the video display screen, and an expectation that the video display screen extends vertically and is planar. The HMD device may optionally have the ability to determine a distance between the HMD device and the video display screen. In another approach, the hub determines the distance to the user/HMD device and can communicates this information to the HMD device. The HMD device can thereby ascertain the location of the video display screen generally and, specifically, the locations of the edges (e.g., vertical and horizontal) of the video display screen. These locations can be stored in memory and represented in a coordinate system of the room. For example, each edge can be represented by a vector having defined endpoints. FIG. 14A provides an example coordinate system. See also FIG. 16 for further details.

FIG. 12A depicts a video display screen, and a region which extends from edges of the video display screen. The video display screen 1110 of FIGS. 11A and 11B is repeated. The video display screen 1110 has top and bottom edges 1200 and 1204, respectively, with a width w1 and right and left edges 1202 and 1206, respectively, with a height h1 which represents an area in which images are displayed by a television, computer monitor or other display device. A region 1208 having a width w2 and a height h2 represents a virtual region in which an augmented reality image is displayed using the HMD device. The region 1208 can have the same or a different aspect ratio as the video display screen.

No image is actually displayed on the wall adjacent to the video display screen. Instead, the virtual region is rendered at the HMD in a way that it appears to the user to be displayed on the wall adjacent to the video display screen. In this manner, an augmented reality image can be displayed in a region of space (e.g., the space in which the user is located such as the room) which appears to the user to be adjacent to, and extend outward from, one or more edges of the video display screen, on a common vertical plane as the video display screen. In this case, the region 1208 does not include the area of the video display screen 1110, so that there is an opening or cutout in the region 1208 in which the video display screen 1110 is provided. Example images are provided in FIG. 12B. This approach allows additional video content or static images to be provided which augment the content of the video display screen, thereby providing a larger overall image and providing a more immersive experience. The augmented reality image can be rendered as a defined shape on a plane or on a curved surface. The defined shape can be a rectangle or, generally, any polygon.

Another option is for the augmented reality image to completely block the video display screen and to display the same content as the video display screen in a different size and/or a different aspect ratio, than the video display screen. The obscuring can be achieved by the opacity filter, for instance. In this case, the region 1208 encompasses the area of the video display screen 1110. The different size can include larger, smaller, and different aspect ratio. See FIGS. 12D and 12E for further details.

The augmented reality images can appear to the user to be in a static location in a substantially vertical plane, when the user looks at the video display screen, and the static location is a specified location relative to the video display screen. For example, the augmented reality images can appear to the user to be fixed in space, so that when the user turns his or head slightly away from the video display screen, the augmented reality images move to a different part of the field of view, by being rendered by different pixels in the HMD device, but are still seen by the user. Whenever the user rotates or otherwise moves the head, the augmented reality image is re-computed so that it appears to be fixed in space. When the user turns his or head significantly away from the video display screen, such as by looking down at the floor or turning around, the augmented reality images move out of field of view, and are no longer rendered by the HMD device and thus are not seen by the user.

Advantageously, an augmented reality image can be larger than a video display screen so that a movie theater experience is provided, without requiring the user to purchase a large video display screen, and by providing a larger overall image than a video display screen which can practically fit in a home.

FIG. 12B depicts the video display screen of FIG. 12A with video content, and the region of FIG. 12A with augmented reality video which augments and is synchronized with the video content of the video display screen. The video display screen 1110 includes a scene of a man such as a cowboy standing on a ground region 1216 in a mountain setting with trees 1210 in the background, and a sky 1212 with a cloud 1214. The supplemental or additional region 1208 provides augmented reality video images in an adjacent region of space of the video display screen 1110 so that the supplemental region 1208 appears to the user as a continuation of the content displayed by the video display screen. For instance, the augmented reality video images can include a color and/or a lighting element of the content displayed by the video display screen. Here, a portion of the supplemental region 1208 which is above the video display screen 1110 provides an additional sky area with clouds, e.g., cloud 1218. A portion of the supplemental region 1208 which is to the right of the video display screen 1110 provides a continuation of the ground region 1216 to a hilltop 1224 where a house 1226 is located. A portion of the supplemental region 1208 which is to the left of the video display screen 1110 provides a continuation of the ground region 1216 with additional trees 1230 and a down sloping ground region 1232. Clouds such as cloud 1222 are also provided. The color of the sky 1212 and/or ground 1216 in the video display screen 1110 can continue in the supplemental region 1208. A lighting element can be a brightness of the sky and/or ground in the video display screen 1110 which can continue in the supplemental region.

The continuation of these elements can be set so that a smooth visual transition is provided from the video display screen 1110 can continue in the supplemental region 1208. For example, the sky region 1220 can be a continuation of the sky region 1212, and the ground regions 1224 and 1232 can be a continuation of the ground region 1216. Note that the ground regions 1224 and 1232 are shown as being aligned with right and left hand portions of the around region 1216. In particular, lines 1233 and 1234 which represent ground regions are aligned, and lines 1235 and 1236 which represent ground regions are aligned. Generally, the alignment between the video display screen and the supplemental region can involve any visual feature.

As mentioned, the augmented reality images in the supplemental region 1208 can be provided in synchronism with the content displayed by the video display screen such as by wireless transmitting, e.g., streaming, the augmented reality images to the HMD device, or by retrieving the augmented reality images from a storage location at the HMD device or the user's clothing/body at indicated times. The augmented reality images can be responsive to a streaming layer of web-based information which is associated with content displayed by the video display screen.

Moreover, the augmented reality images in the supplemental region 1208 can be updated at the same rate as the video display screen 1110, or at a different rate. In one approach, the supplemental region 1208 can be include one, or a series, of static background images. For example, if the video display screen 1110 provides a Western genre movie which includes many scenes in a desert setting, the supplemental region 1208 can provide a typical scene of a desert which is maintained over one or more scenes of the movie, e.g., for several seconds or minutes at a time, or even over the entire duration of the movie. The supplemental region 1208 need not be a precise continuation of the content of the supplemental region 1208, but can provide a background with a common theme as the content of the video display screen.

Figure 12C:
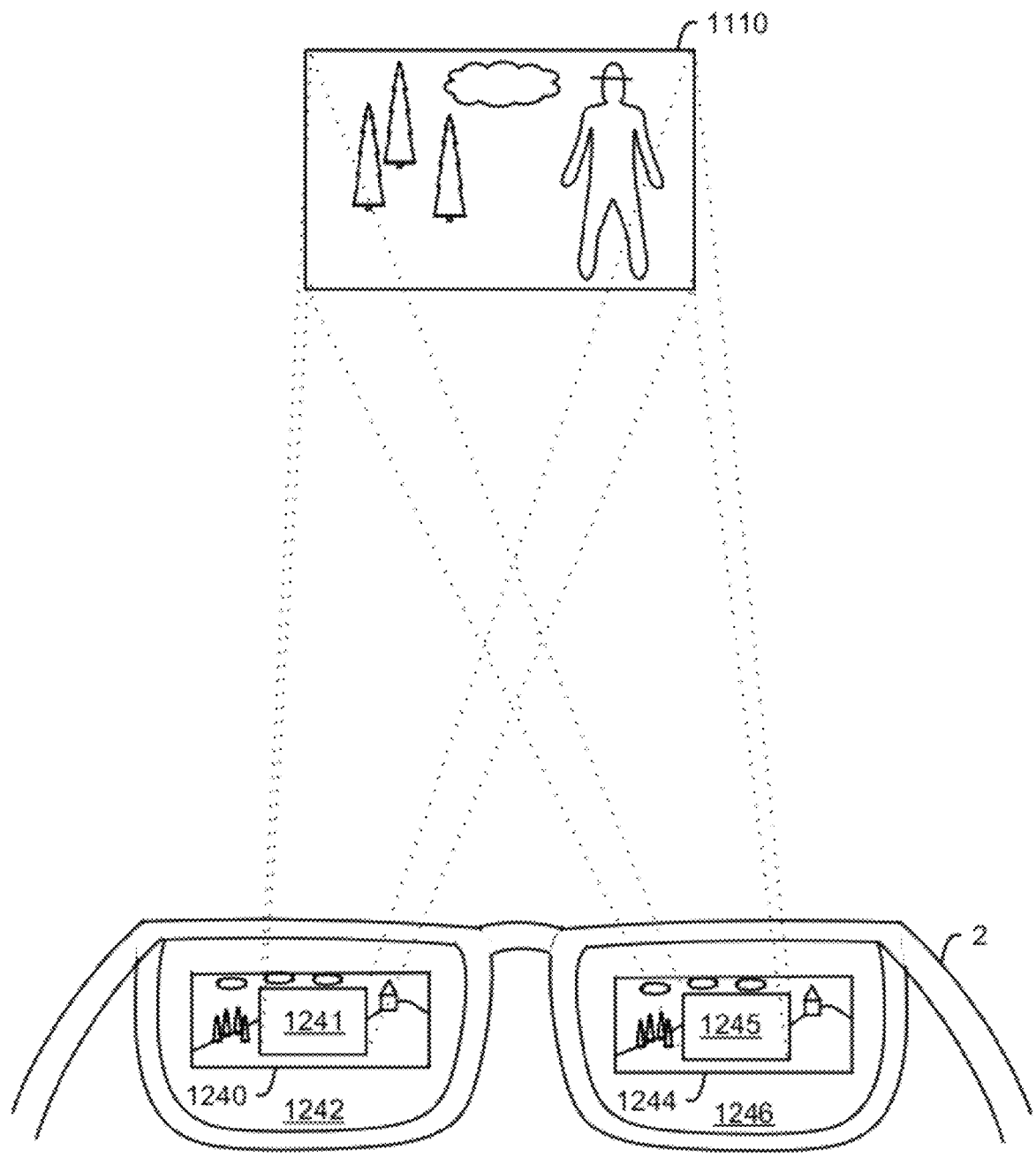
FIG. 12C depicts the images of FIG. 12B as seen via a HMD device.

FIG. 12C depicts the images of FIG. 12B as seen via a HMD device. The video display screen 1110 is seen by the user as a real-world scene through the see-through lenses of the HMD device 2. The dotted lines depict rays of light which travel from corners of the video display screen 1110 to each of the user's eyes. The view of the HMD device 2 is from the perspective of the user, and indicates that corresponding augmented reality images 1240 and 1244 (corresponding to region 1208) are provided by each lens 1242 and 1246, respectively, of the HMD device. The augmented reality images can appear to the user to be focused at a distance which is about the same as the distance of the video display screen. The depiction of the augmented reality images at the lenses of the HMD device is merely meant to indicate that the augmented reality images are generated by the HMD device rather than being part of the real-world scene which includes the video display screen. As mentioned in connection with FIG. 2, the augmented reality image can be provided by the light guide optical element 112 by emitting light into the user's eye, where each of the lenses 1242 and 1246 is meant to represent an overall lens assembly which includes, e.g., lens 116, opacity filter 114, light guide 112 and lens 118. The open regions 1241 and 1245 indicate where light from the video display screen enters the user's eyes.

Figure 12D:
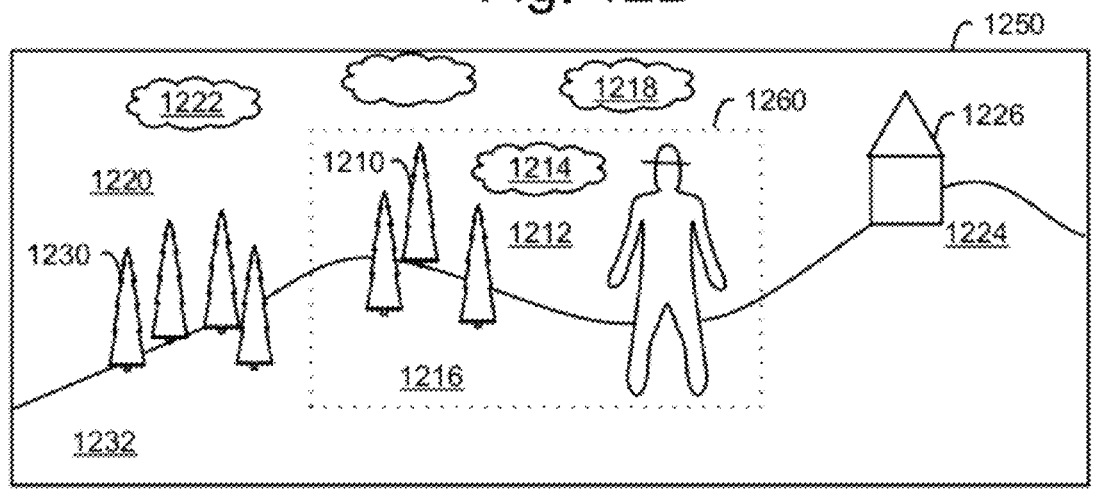
FIG. 12D depicts an alternative to FIG. 12B, where the video display screen is blocked and replaced by a larger area of augmented reality video.

FIG. 12D depicts an alternative to FIG. 12B, where the video display screen is blocked and replaced by a larger area of augmented reality video 1250. In this case, the opacity filter associated with the head-mounted display unit is controlled to blocks the user's eye from seeing the video display screen, whose location is depicted by dotted rectangle 1260 for reference. Moreover, the augmented reality video image 1250 replace the content displayed by the video display screen with a larger sized image, to provide a large-screen theater effect. In one approach, the augmented reality video image can be provided at a fixed location in space which overlaps the video display screen, responsive to detecting that the user is looking in the direction of the video display screen, e.g., the video display screen is in a field of view of the user. At other times, when the user is not looking in the direction of the video display screen, the augmented reality video image may not be provided and the video display screen may not be blocked, in one possible approach. It is also possible for the augmented reality video image to be provided at a fixed location in space which does not overlap the video display screen (see FIG. 15A).

Advantageously, when the video display screen is blocked and replaced by the augmented reality video 1250, the augmented reality video 1250 can use the same channel of data which provides the content of the video display screen. No additional channel of data for the augmented reality video needs to be provided.

Figure 12E:
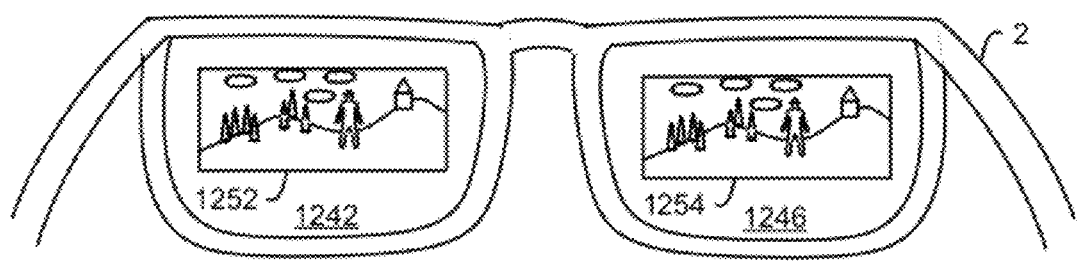
FIG. 12E depicts the image of FIG. 12D as seen via a HMD device.

FIG. 12E depicts the image of FIG. 12D as seen via a HMD device. Corresponding augmented reality images 1252 and 1254 (corresponding to region 1250) are provided by each lens 1242 and 1246, respectively, of the HMD device. In one approach, as mentioned, essentially no light from the video display screen enters the user's eyes.

Figure 13A:
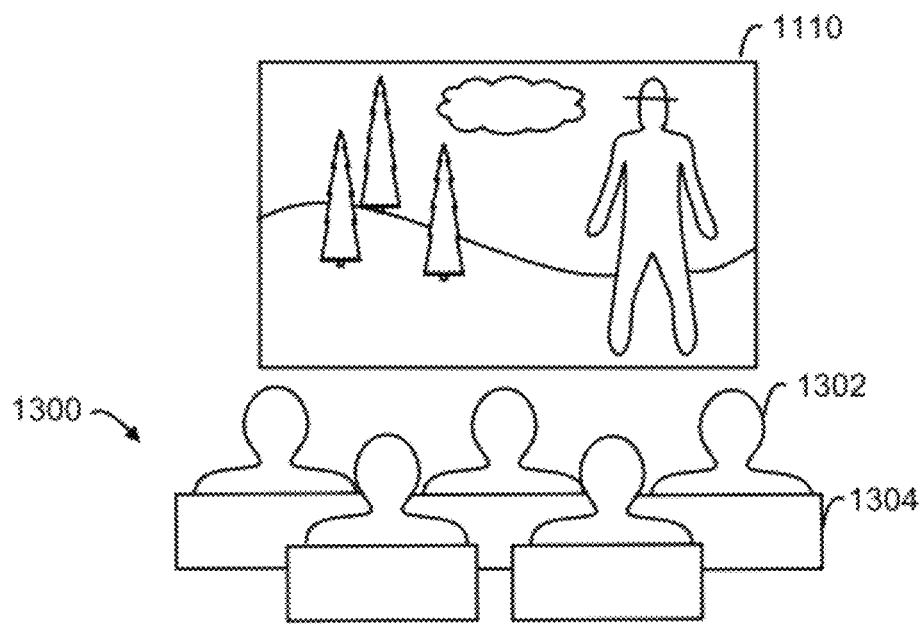
FIG. 13A depicts a video display screen with video content, where augmented reality video of a virtual audience is also provided.

FIG. 13A depicts a video display screen with video content, where augmented reality video of a virtual audience is also provided. To enhance the feeling of being in a movie theater or other communal location, augmented reality video of one or more audience members 1300 can be provided. An example audience member 1302 is depicted from the back, as if the audience member 1302 was sitting in front of the user and viewing the video display screen 1110 with the user. The example audience member 1302 is facing the video display screen 1110 as if he or she was viewing the video display screen. A chair back 1304 of the example audience member 1302 is also depicted. The augmented reality video provides a 3-D image which includes at least one audience member which appears to the user to be co-located with the user and to be viewing the video display screen with the user.

It is possible for the augmented reality video to depict one or more audience members as if they were sitting alongside the user, behind the user, across the room from the user, or other relative location with respect to the user. The audience members can be animated, making occasional movements (e.g. shifting from side to side, rocking in their chair, stretching), and sounds (e.g., laughing, clapping, cheering, yawning) which are common in a movie theater. Further, spatialized audio can be provided based on a virtual location of the at least one audience member. That is, sounds which are generated by the audience member can be made to appear to the user to be emitted from a particular location in which the audience member appears to be, and not necessarily from the location of speakers.

Further, the appearance and audio of the audience can be synchronized with the content of the video display screen, so that the audience reacts based on the content. In one approach, the audience members can have an appearance which is based on the appearance of friends of the user so that the user appears to be watching the video display screen with the friends. The user can select the appearance and characteristics of the audience members beforehand via a user interface. In one option, the audience members represent other users in a different location and project the voices or other sounds made by the other users via an audio channel. The audience members could also make movements based on tracked movements of the other users in the different location.

FIG. 13B depicts the images of FIG. 13A as seen via a HMD device. Corresponding augmented reality images 1310 and 1312 (corresponding to image 1300) are provided by each lens 1242 and 1246, respectively, of the HMD device. The open regions 1241 and 1245 indicate where light from the video display screen enters the user's eyes. The supplemental augmented reality region 1208 discussed previously could also be provided, but is not depicted here.

FIG. 14A depicts different perspectives and locations of different users relative to a video display screen. The video display screen 1110 depicted previously is provided from a top view in which its width w1 and thickness are seen. The video display screen 1110 extends in a vertical x-y plane, where the y- and z-axes of a Cartesian coordinate system are shown. An x-axis (not shown) extends out of the page. The z-axis is normal or perpendicular to the x-y plane. An origin of the coordinate system can be at the location of the video display screen, along a focal axis of a depth camera of the hub, or at another specified location.

An angle $\alpha 1$ represents an angular offset from the z-axis when a user is at a location 1400, while an angle $\alpha 1$ represents an angular offset from the z-axis when a user is at a location 1402. Generally, the user views the video display screen from a perspective which is based on the user's angular offset (e.g., in a horizontal y-z plane) relative to the normal axis. Similarly, a 3-D augmented reality image can be rendered from the user's perspective. For example, a 3-D augmented reality image can be rendered from the perspective of the location 1400 for a first user at that location, while, concurrently, the 3-D augmented reality image is rendered from the perspective of the location 1402 for a second user at that location. In this way, the augmented reality image is rendered in the most realistic way for each user. The perspective of a user relative to the augmented reality image is the user's point of view of the image, as illustrated by the following examples.

Figure 14B:
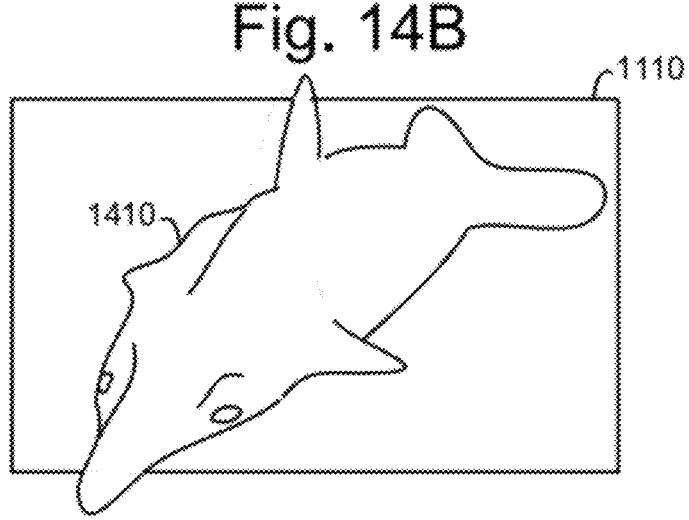
FIG. 14B depicts a 3-D augmented reality object as seen by a first user from a first perspective, where the object appears to be coming out of the video display screen.

FIG. 14B depicts a 3-D augmented reality object as seen by a first user from a first perspective, where the object appears to be coming out of the video display screen. In this example, the 3-D augmented reality object 1410 is a dolphin which appears to have emerged from the video display screen 1110. The dolphin is rendered from the perspective of the user location 1400 of FIG. 14A, which is slightly right of the normal axis. In this example, assume the dolphin would appear to come straight out, directly toward a user that is located directly on the normal axis. A portion of the video display screen 1110 which is behind the 3-D augmented reality object 1410, from the perspective of the user location 1400, can be masked by setting the opacity filter, so that the user sees the 3-D augmented reality object 1410 but not the pixels of the video display screen 1110 which are behind the 3-D augmented reality object 1410. The opacity filter associated with the HMD device thus blocks the user's eye from seeing at least a portion of the video display screen. The user continues to see the pixels of the video display screen 1110 which are not behind the 3-D augmented reality object 1410. These pixels typically provide an image which is related to the 3-D augmented reality object. For instance, an ocean scene may be related to a dolphin.

In one approach, the developer of the content of the video display screen prepares additional content for the augmented reality images. For example, a movie director can provide such additional content as one or more additional channels of data which can be released with the movie. The additional content can be developed at the same time as preparing the movie or at another time. For example, the additional content can be prepared for pre-existing movies. This allows developers which are not related to the movie company to develop augmented reality content as an add on product which can be purchased or used separately by the user. Competing developers can produce content from which a user can choose. A marketplace for such augmented reality content could be encouraged. An animation script for the additional content can also be developed, e.g., so that a 3-D object can be made to emerge from the video display screen, fly around the room and return to the video display screen.

The movie itself could be filmed in 2-D or stereoscopically. For example, one channel of data could be used to provide the supplemental augmented reality region 1208, and another channel could be used to provide the 3-D augmented reality object 1410, or generally one or more 3-D objects. For a user who does not use an HMD device, the content of the video display screen can appear in a conventional 2-D or stereoscopic format. The additional channels of content can be provided in different ways. In one approach, the content of the video display screen such as a movie can be shipped on an optical storage medium such as a Blue-ray or DVD disc, where one or more additional tracks on the disc provide the augmented reality content. In another approach, the content of the video display screen and the augmented reality content can be broadcast, streamed or otherwise transmitted via a transmission network such as a cable television network, satellite television network, the Internet or other computer network, cell phone network, or other means. The transmitted content can be received by the hub and relayed to the HMD device.

Or, the channel of content for the video display screen may be provided separately from the augmented reality content. For example, a game console can be used to play the augmented reality content, while the content for the video display screen is provided via another storage medium or via a transmission network.

Moreover, there can be multiple options for indexing the augmented reality content, e.g., according to rating (adult vs. child) or other category. An HMD device may select one channel of augmented reality content from among multiple available channels, e.g., in a wireless transmission or from a storage device, based on a setting of the HMD device. In one approach, a user enters login information via a user interface, such as via the video display screen, and based on preferences and settings associated with the user, the hub identifies a corresponding channel of augmented reality content to transmit wirelessly to the user's HMD device. In one option, the hub only transmits the corresponding channel of augmented reality content to the user's HMD device while not transmitting one or more other available channels of augmented reality content to the user's HMD device. In another option, the hub transmits multiple channels of augmented reality content to the user's MID device, and the user's HMD device processes and displays only the corresponding channel while discarding the other channels of augmented reality content. The hub may transmit data to the user's HMD device which sets the channel to process. When multiple users and their HMD devices are in use, each user's HMD device can process only the respective channel of augmented reality content which is intended for it.

To provide the 3-D augmented reality object, an augmented reality emitter is controlled to provide a 3-D display, which is rendered from a perspective of the user, based on the orientation and location of the user's head. The 3-D augmented reality object can include an object moving through space, away from the video display screen, where the object is rendered from the perspective of the user, based on the orientation and location of the user's head, and is temporally synchronized with the content displayed by the video display screen. Regarding the temporal synchronization, this indicates, e.g., that the 3-D augmented reality object is provided at a particular time which corresponds to the content displayed by the video display screen.

In one option, the 3-D augmented reality object appears to emerge from the video display screen and move around the room. Moreover, using a depth camera which can detect a gesture of the user, the augmented reality emitter can be controlled to display the 3-D object moving through space in response to a detected gesture of the user. For example, the user may make a gesture of swatting away the 3-D augmented reality object, in response to which the rendering of the 3-D augmented reality object is adjusted to indicate that the 3-D augmented reality object moves away from the user. Alternatively, the 3-D augmented reality object could move closer to the user, appearing to interact with user. The 3-D augmented reality object could also move relative to the user based on the location of the user, without necessarily detecting a gesture of the user. For example, the 3-D augmented reality object could be made to approach a user, interact with the user, and then move away from the user.

Further, the 3-D object can be displayed using any type of virtual surface, including flat/planar, spherical or cylindrical video. For spherical or cylindrical video, the display of the object is responsive to rotation of the user's head and the perspective of the user may be fixed to the center of the sphere or cylinder. The augmented reality images can be encoded for display in a sphere or cylinder, where the user sees only a portion of the sphere or cylinder at a given time depending on the direction in which the user looks. For example, the augmented reality images could be used to provide a scene where the user looks down to see the floor of a forest, looks up to the sky and looks left and right to see trees.

When multiple users are present, since each user sees the 3-D object from a different perspective, realism is enhanced.

Compared to stereoscopic television, in which the pixels of the television can be adjusted to make an object appear closer or further to the user, the 3-D object provided herein is not limited to the boundaries of the video display screen and its pixels, and can be displayed anywhere in the user's field of view. Moreover, coordination of the movement of the 3-D object with the content of the video display screen adds realism and drama while maintaining compatibility of the content with non-HMD device users. A user can add the HMD device for use with an existing video display screen.

Figure 14C:
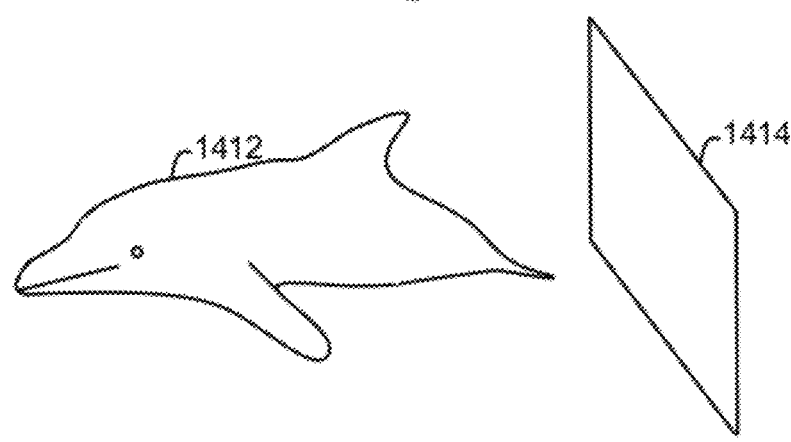
FIG. 14C depicts the 3-D augmented reality object of FIG. 14C as seen by a second user from a second perspective, where the object appears to be coming out of the video display screen.

FIG. 14C depicts the 3-D augmented reality object of FIG. 14C as seen by a second user from a second perspective, where the object appears to be coming out of the video display screen. The 3-D augmented reality object 1412 is the same dolphin as in FIG. 14B but it is rendered from the perspective of the user location 1402 of FIG. 14A, which is substantially to the right of the normal axis. The video display screen 1414 is also seen from the same user perspective. In this case, no pixels of the portion of the video display screen 1414 are behind the object 1412, so that the opacity filter need not be used for masking the pixels. A side view of the dolphin is seen by the second user instead of the slightly left-of-center view of FIG. 14B.

Figure 14D:
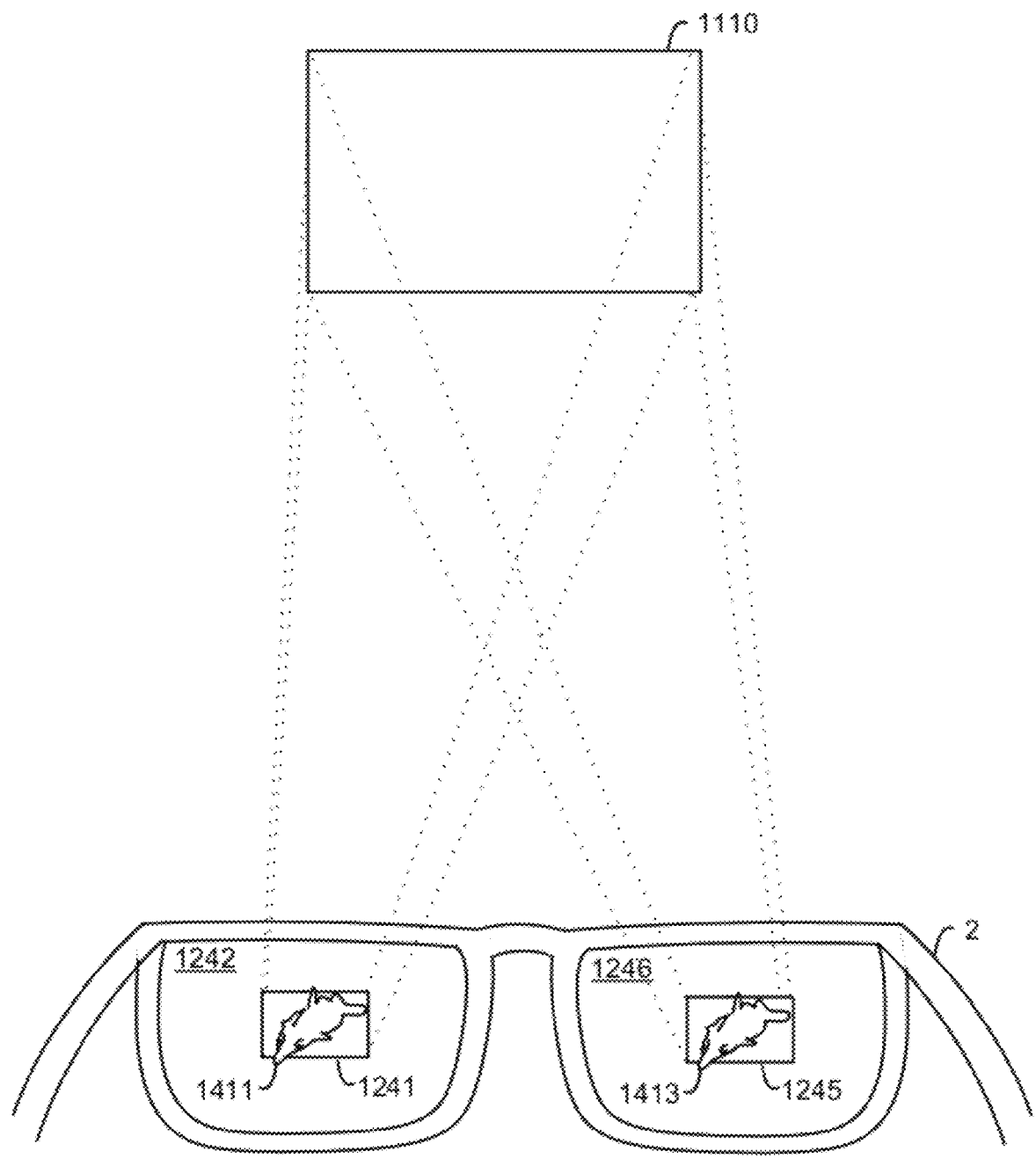
FIG. 14D depicts the images of FIG. 14B as seen via a HMD device.

FIG. 14D depicts the images of FIG. 14B as seen via a HMD device. Corresponding augmented reality images 1411 and 1413 (corresponding to object 1410) are provided by each lens 1242 and 1246, respectively, of the HMD device. The open regions 1241 and 1245 indicate where light from pixels of the video display screen which are not masked out enters the user's eyes. The supplemental augmented reality region 1208 discussed previously could also be provided, but is not depicted here.

Figure 14E:
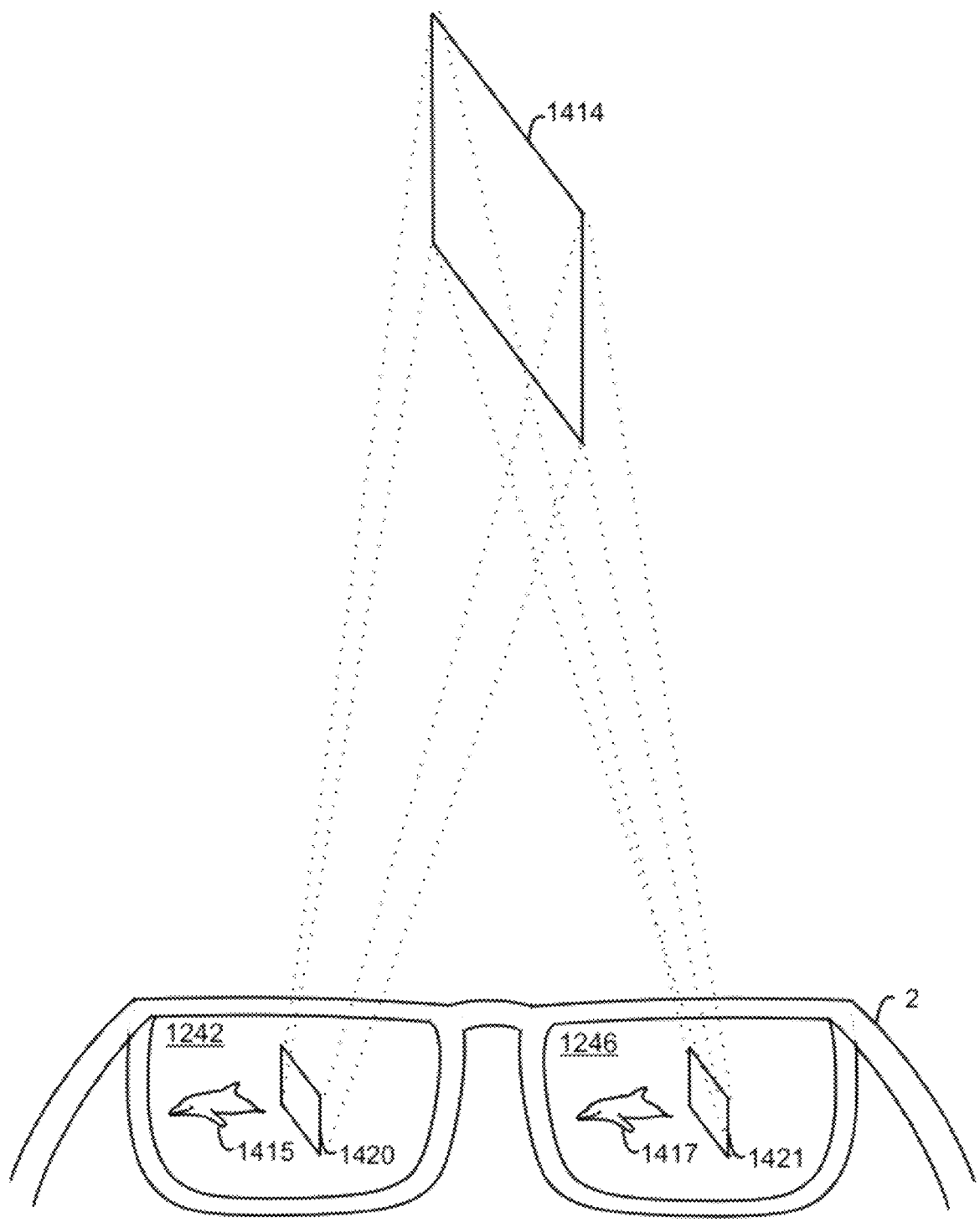
FIG. 14E depicts the images of FIG. 14C as seen via a HMD device.

FIG. 14E depicts the images of FIG. 14C as seen via a HMD device. Corresponding augmented reality images 1415 and 1417 (corresponding to object 1412) are provided by each lens 1242 and 1246, respectively, of the HMD device. The open regions 1420 and 1421 indicate where light from pixels of the video display screen which are not masked out enters the user's eyes. The supplemental augmented reality region 1208 discussed previously could also be provided, but is not depicted here.

Figure 15A:
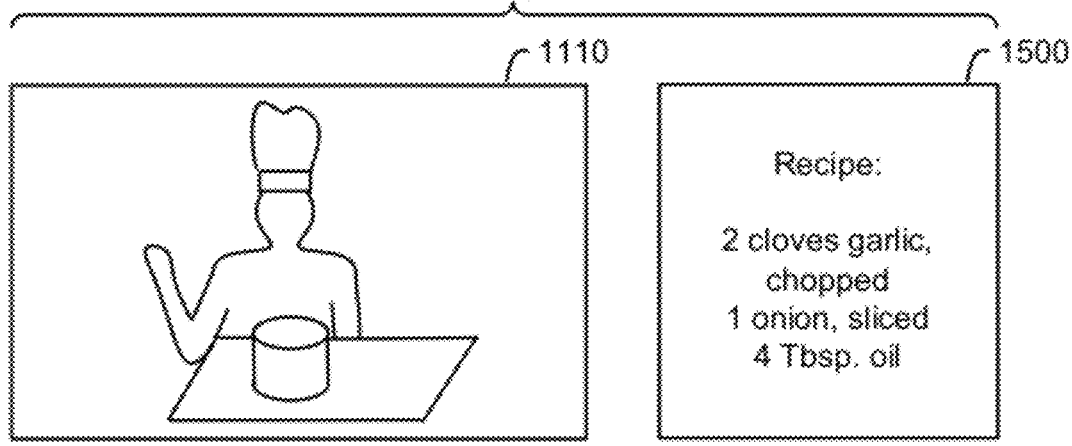
FIG. 15A depicts a video display screen and an augmented reality image which is in a static location on a substantially vertical plane when a user looks at the video display screen.

FIG. 15A depicts a video display screen and an augmented reality image which is in a static location on a substantially vertical plane when a user looks at the video display screen. Here, the video display screen 1110 provides content such as a cooking show in which a chef demonstrates how to prepare a meal based on a recipe. An augmented reality image 1500 provides instructional text or other text related to the content, such as list of ingredients of the recipe. In one implementation, the augmented reality image 1500 is provided in a static location such as a location which appears to be slightly to the right of the video display screen. The augmented reality image 1500 may be temporally synchronized with the content of the video display screen since the recipe of the augmented reality image 1500 appears during a portion of the show in which the chef is preparing a meal using the recipe. The video display screen typically extends in a vertical plane and may be mounted to a wall, or otherwise secured in an upright position. In this case, it is convenient for the augmented reality image 1500 to appear alongside the video display screen, even if the augmented reality image 1500 is not a continuation of the same content of the video display screen.

The display of an augmented reality emitter can be triggered in response to determining that the user is looking at the video display screen, based on knowledge of an orientation and/or location of the user's head as obtained from one or more sensors of the HMD device. A determination that the user is looking at the video display screen can be made, e.g., by determining that the user is looking forward as opposed to looking up or down, and/or determining that the video display screen is within the user's field of view, or within a central, subset portion of the user's field of view. In this implementation, an augmented reality emitter is controlled to display augmented reality images which appear to the user to be in a static location in a substantially vertical plane, when the user looks at a video display screen, and the static location in the substantially vertical plane is a specified location relative to the video display screen, e.g., one foot to the right of the rightmost edge of the video display screen. When the user looks away from the video display screen, the display of the augmented reality image 1500 in a vertical plane at the static location with respect to the video display screen can be terminated. At this time, the augmented reality image 1500 could alternatively be displayed at another virtual location such as in a horizontal plane, as discussed below in connection with FIG. 15B, or not displayed at all. Subsequently, when the user again looks toward the video display screen, the display of the augmented reality image 1500 in the vertical plane at the static location with respect to the video display screen can be resumed.

Figure 15B:
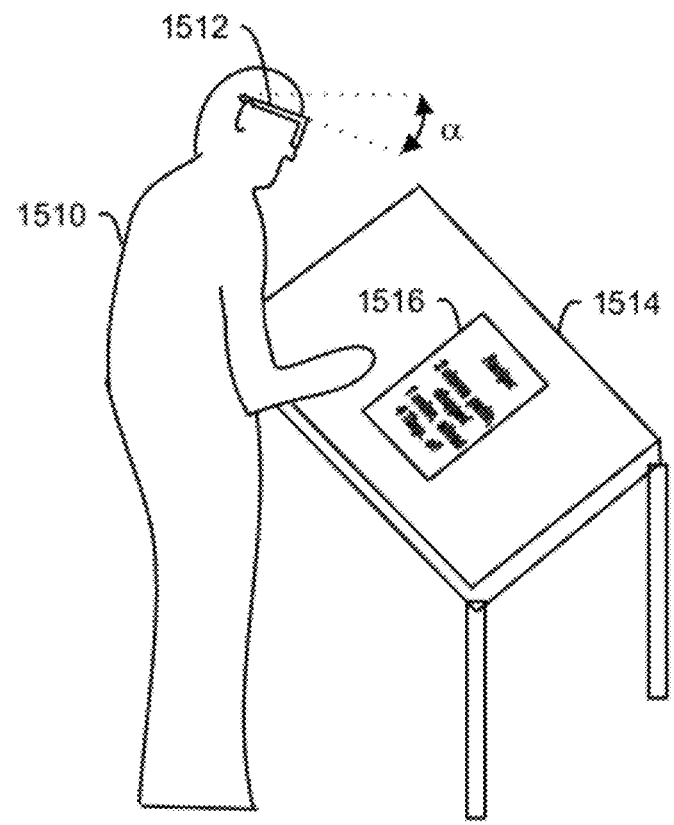
FIG. 15B depicts an augmented reality image which is in a static location on a substantially horizontal plane when a user looks down.

FIG. 15B depicts an augmented reality image which is in a static location on a substantially horizontal plane when a user looks down. Here, assume the user 1510 is in a position in which he can look forward to see the cooking show on the video display screen 1110 of FIG. 15A, and also look down at a table 1514 with a generally horizontal surface, e.g., where the user works to follow the recipe of the cooking show. The user periodically looks down, as indicated by the downward angle $\alpha$ of the HMD device 1512 relative to the horizontal. In response to detecting that the user is looking down, the augmented reality image can be made to appear to the user to be in a static location in a substantially horizontal plane, such as depicted by the augmented reality image 1516 on the table 1514. In this way, the user can easy follow the text or other instructions while transitioning between looking forward at the video display screen and looking down at the work surface. In addition to a cooking show, the augmented reality image can provide instructions or other information which supplements, and is related to, the content on the video display screen. Related content could also include a director's commentary or an actor's interview relating to a movie which is provided on the video display screen.

In another approach, the augmented reality images can provide information which is unrelated, or at least is not temporally synchronized with, the content of the video display screen. Unrelated content could include web data such as an e-mail or text messaging window, or a feed from a social networking website. This would allow the user to monitor one window of information while also viewing the video display screen.

A determination that the user is looking down can be based on the angle $\alpha$ (an angle of inclination) of the HMD device 1512 exceeding a specified value, or being within a specified range of values. Similarly, a determination that the user is looking forward can be based on the angle $\alpha$ of the HMD device 1512 being within a specified range of values, and/or based on an azimuth angle (not shown) of the HMD device 1512 being within a specified range of values.

Figure 15C:
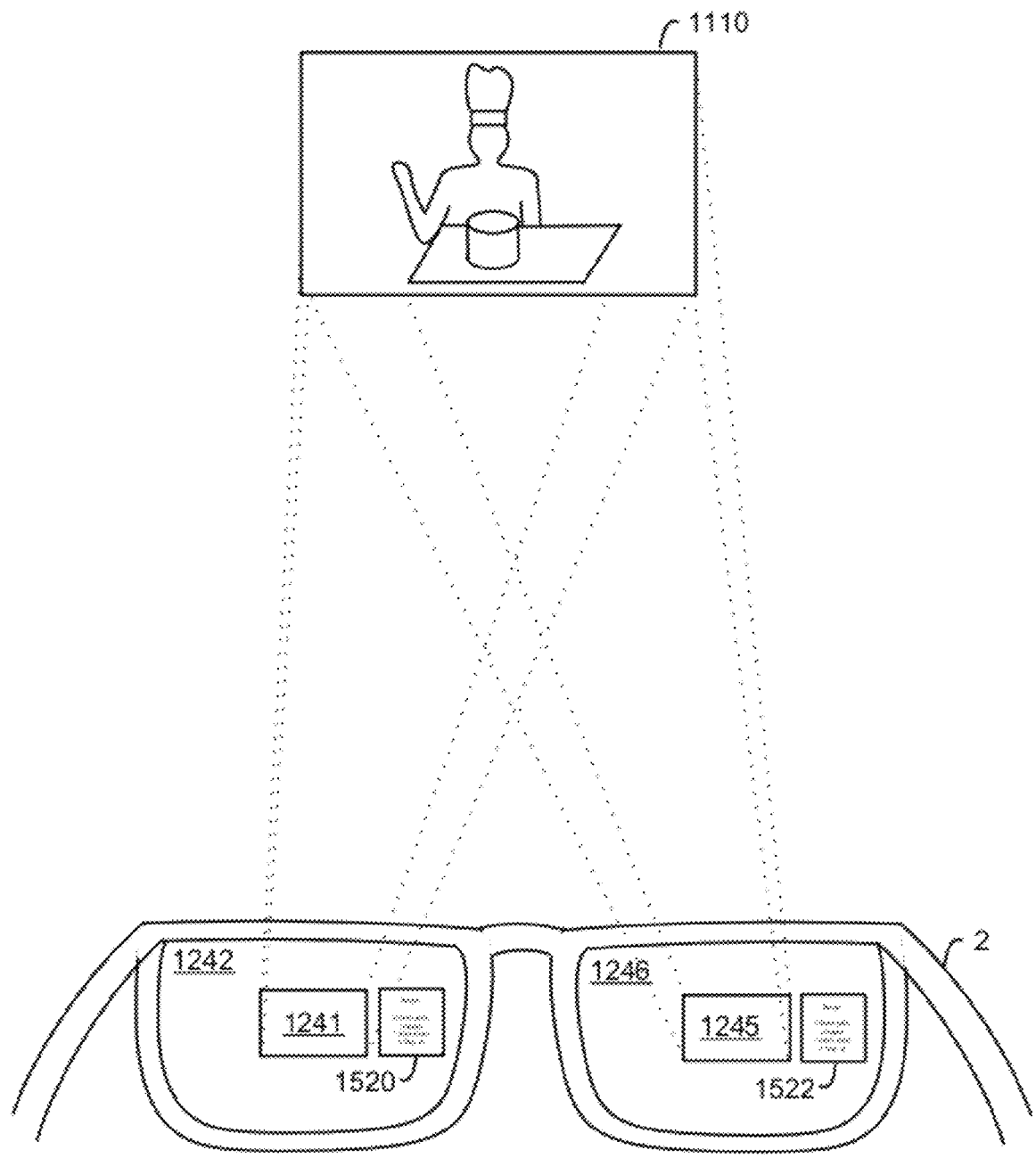
FIG. 15C depicts the images of FIG. 15A as seen via a HMD device.

FIG. 15C depicts the images of FIG. 15A as seen via a HMD device. Corresponding augmented reality images 1520 and 1522 (corresponding to image 1500) are provided by each lens 1242 and 1246, respectively, of the HMD device. The open regions 1241 and 1245 indicate where light from the video display screen enters the user's eyes.

Figure 15D:
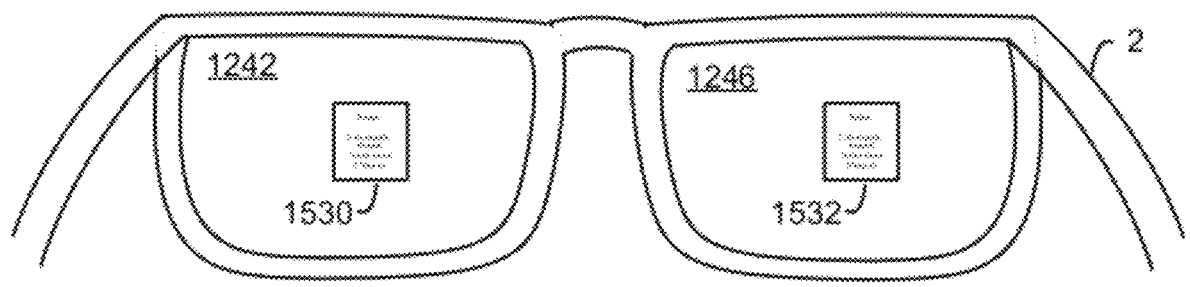
FIG. 15D depicts the images of FIG. 15B as seen via a HMD device.

FIG. 15D depicts the images of FIG. 15B as seen via a HMD device. Corresponding augmented reality images 1530 and 1532 (corresponding to image 1500) are provided by each lens 1242 and 1246, respectively, of the HMD device. Light from the video display screen does not enter the user's eyes in this situation because the user is looking down. In this example, the augmented reality images 1530 and 1532 are provided in approximately the center of the user's field of view. However, it is also possible to provide augmented reality images 1530 and 1532 in a similar right-of-center position as seen with the augmented reality images 1520 and 1522, or generally in any desired position within the field of view.

Figure 16:
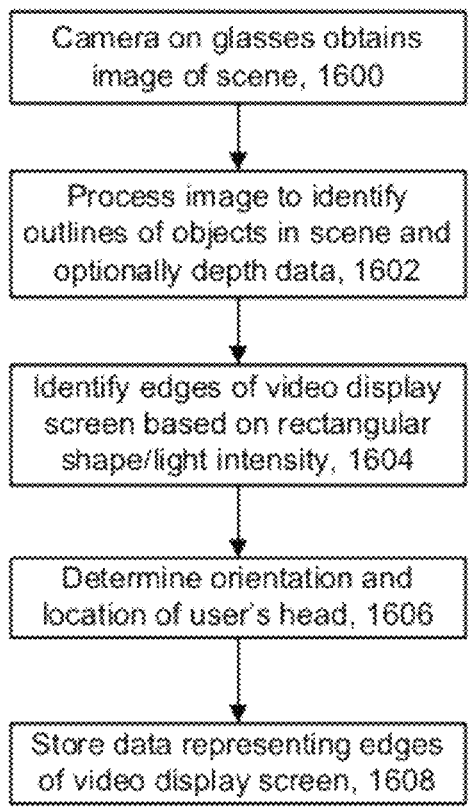
FIG. 16 depicts a flowchart of a process in which edges of a video display screen are detected.

FIG. 16 depicts a flowchart of a process in which edges of a video display screen are detected. As mentioned previously (see, e.g., FIGS. 11B-12C), the content of a video display screen can be supplemented or extended to provide an augmented reality image which is located in virtual space adjacent to one or more edges of the video display screen. In one possible implementation, step 1600 includes using one or more front-facing cameras on the HMD device to obtain an image of a scene, including the video display screen, which the user is looking at. In another possible implementation, a camera is at another location in the room, such as a fixed location, and faces the video display screen.

Step 1602 includes processing the image to identify outlines of objects in the scene (see also FIG. 11B). Optionally, if the camera has a depth sensing capability, a depth of the objects from the camera can be determined. Or, a depth camera of the hub can detect the distance of the user from the hub and communicate this distance to the HMD device as an indication of the distance from the HMD device to the video display screen, assuming the hub and the video display screen are approximately co-located. Step 1604 includes identifying one or more edges of the video display screen. Step 1606 includes determining an orientation and/or location of the user's head. For example, this can be done by determining an orientation and/or location of the HMD device based on one or more sensors carried by the HMD device, and/or by using information from a motion tracking depth camera at the hub.

Step 1608 includes storing data representing the edges of the video display screen. For example, each edge can be represented by a vector having defined endpoints. It may be sufficient to determine the edges of the video display screen one time and to use that information in subsequent viewing by the user. Or, the edges of the video display screen can be re-determined at the start of a viewing session by the user, or when the HMD device is powered on, or once a day, or at other specified times, or when a specified movement or change in location of the user is detected, or based on other triggering criteria.

Figure 17:
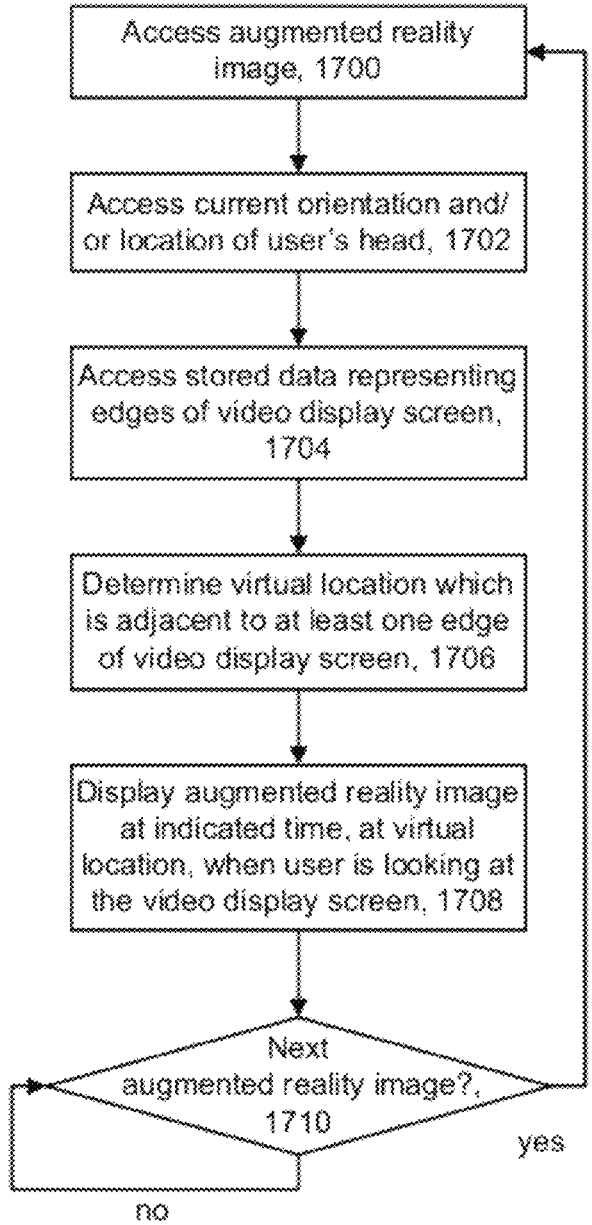
FIG. 17 depicts a flowchart of a process in which augmented reality video is provided adjacent to edges of a video display screen.

FIG. 17 depicts a flowchart of a process in which augmented reality video is provided adjacent to edges of a video display screen. Step 1700 includes accessing an augmented reality image. For example, the HMD device can access an augmented reality image by receiving wireless data from the hub, or by accessing a local storage media. Step 1702 includes accessing the current orientation and/or location of the user's head, e.g., from real-time readings from one or more sensors at the HMD device. Such readings can be continually updated, e.g., multiple times per second, so that movements in the head are continuously tracked. Step 1704 includes accessing stored data representing the edges of the video display device (e.g., based on step 1608 in FIG. 16). Step 1706 includes determining a virtual location which is adjacent to at least one edge of the video display device, such as region 1208 in FIG. 12A. This can be the location in real space in which the augmented reality image appears, to the user, to be located. Step 1708 includes displaying an augmented reality image at an indicated time, at the determined virtual location of step 1706, when the user is looking at the display device. The augmented reality image can be rendered as a graphic from a perspective of a virtual camera that has the same orientation and location as the user's head. Each user's HMD device renders the augmented reality image appropriate to their point of view, such that the augmented reality image is transformed and rotated to match their perspective. At decision step 1710, if there is a next augmented reality image, the process is repeated starting at step 1700. The augmented reality image can be updated at a similar frame rate as video, e.g., 30 frames per second, or at any desired rate or at indicated times which do not necessarily correspond to a fixed rate.

Figure 18:
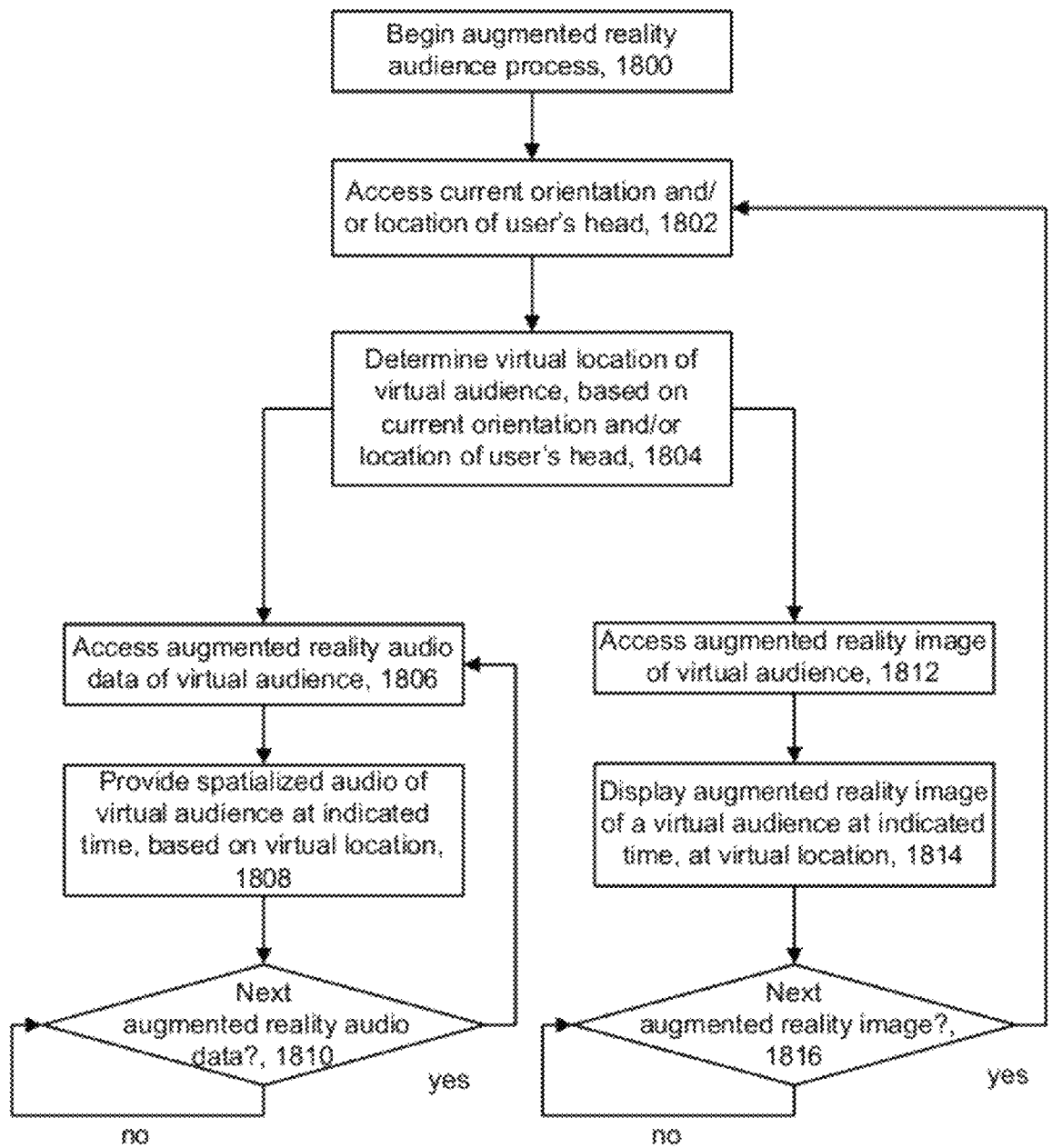
FIG. 18 depicts a flowchart of a process in which a 3-D virtual audience is rendered from a perspective of a user.

FIG. 18 depicts a flowchart of a process in which a 3-D virtual audience is rendered from a perspective of a user. See also FIGS. 13A and 13B. Step 1800 begins an augmented reality audience process. Step 1802 includes accessing a current orientation and/or location of the user's head, similar to step 1702 of FIG. 17. Step 1804 includes determining a virtual location of the virtual audience, based on the current orientation and/or location of the user's head. This can be a location in real space in which the virtual audience appears, to the user, to be located. Audio and video processing can occur in parallel paths, concurrently. In an audio processing path, step 1806 includes accessing augmented reality audio data of a virtual audience, e.g., from a wireless link to the hub or from local storage. Step 1808 includes providing spatialized audio of a virtual audience at an indicated time, and based on the virtual location of step 1804. At decision step 1810, if there is next augmented reality audio data, such as one or more frames of audio data encoded in a known format, such as MP3 or other digital audio coding standard, then step 1806 is repeated. In some cases, the user's location is sufficient to provide the spatialized audio, and the orientation of the head is not used. In one approach, it is assumed that the user is stationary when viewing the video display screen, so that updates to the user's location will not be needed to provide the spatialized audio of the virtual audience. However, it is also possible to perform such updates, e.g., by repeating steps 1802 and 1804 after decision step 1810.

In an image processing path, step 1812 includes accessing an augmented reality image of a virtual audience. Step 1814 includes displaying the augmented reality image of the virtual audience at an indicated time, at the virtual location of step 1804. At decision step 1816, if there is next augmented reality image, such as one or more frames of image data encoded in a known format, then step 1802 is repeated. In this case, frequent updates to the orientation and/or location of the user's head are useful in tracking movements of the user's head and adjusting the augmented reality image accordingly so that the virtual image appears realistically at the same virtual location, and does not vary unexpectedly when the user moves the head.

Figure 19:
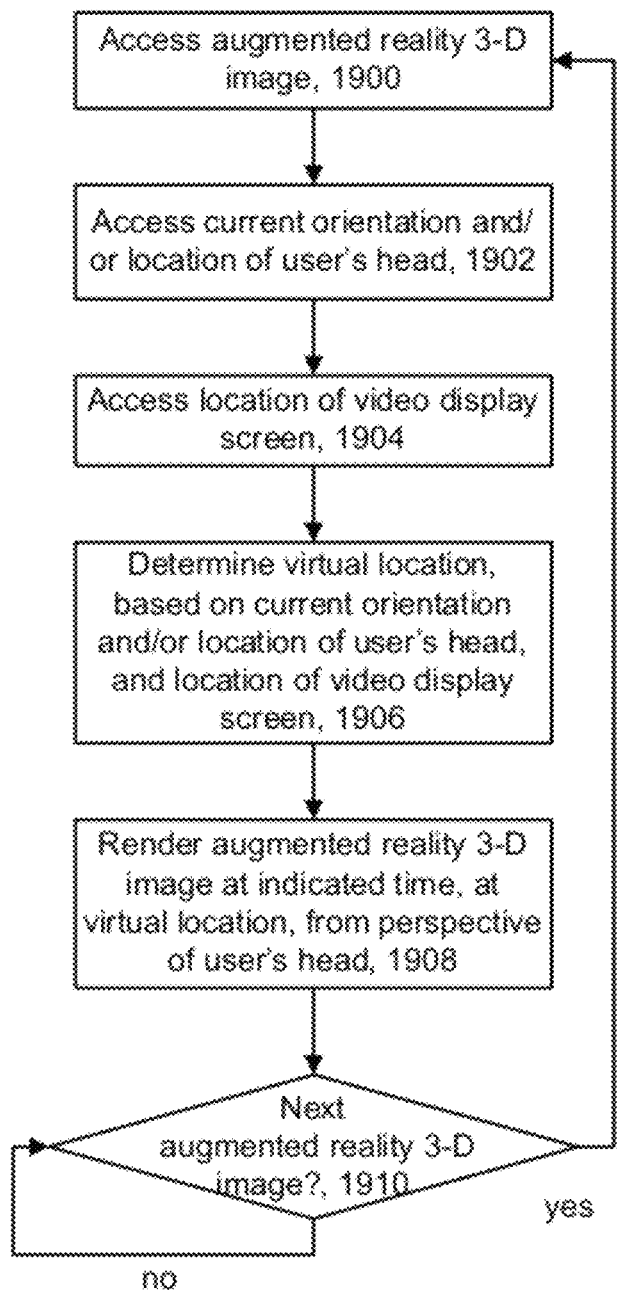
FIG. 19 depicts a flowchart of a process in which a 3-D object associated with content of a video display screen is rendered from a perspective of a user.

FIG. 19 depicts a flowchart of a process in which a 3-D object associated with content of a video display screen is rendered from a perspective of a user. See also FIGS. 14B-14E. Step 1900 includes accessing an augmented reality 3-D image, such as by using the previously-discussed ways of accessing an augmented reality image. Step 1902 includes accessing a current orientation and/or location of the user's head, similar to step 1702 of FIG. 17. Step 1904 includes accessing the location of the video display screen, similar to step 1704 of FIG. 17. Step 1906 includes determining a virtual location based on the current orientation and/or location of the user's head, and based on the location of the video display screen from step 1904. Step 1908 includes rendering an augmented reality 3-D image at an indicated time, at the virtual location of step 1906, from a perspective of the user, e.g., the user's head. At decision step 1910, if there is a next augmented reality 3-D image, the process is repeated starting at step 1900.

FIG. 20 depicts a flowchart of a process in which augmented reality images are rendered in a static location. See also FIGS. 12D, 12E and 15A-15D. Step 2000 includes accessing an augmented reality image, similar to step 1700 of FIG. 17. Step 2002 includes accessing a current orientation and/or location of the user's head, similar to step 1702 of FIG. 17. Step 2004 includes accessing a location of a video display screen. This could involve identifying the screen edges such as in step 1604 of FIG. 16, or determining a single representative location of the video display screen. Step 2006 includes determining a first virtual static location in a substantially vertical plane (e.g., image location 1500 in FIG. 15A), based on the current orientation and/or location of the user's head, and based on the location of the video display screen. At the same time, or at another time, step 2008 includes determining a second virtual static location in a substantially horizontal plane (e.g., image location/table 1514 in FIG. 15B), based on the current orientation and/or location of the user's head. Step 2010 includes determining whether the user is looking forward, e.g., at the video display screen, or down, e.g., at a table or work surface.

Step 2012 includes rendering the augmented reality image at the first virtual location when the user looks forward and/or or at the video display screen. The augmented reality image can supplement the video display screen, such as in the way region 1500 supplements the video display screen 1110 of FIG. 15A, or block the video display screen, in whole or in part, such as in the way region 1250 blocks the video display screen region 1260 of FIG. 12D. Alternatively, step 2014 includes rendering the augmented reality image at the second virtual location when the user looks down. See region 1516 of FIG. 15B. At decision step 2016, if there is a next augmented reality image, the process is repeated starting at step 2000.

The technology herein can be used to provide a well-calibrated and user-tracked system incorporating an existing video display screen such as a television into fully immersive mixed-reality, where some content can be drawn on a the video display screen and other content drawn on a see-through HMD that can look in any direction from any user vantage point. The content drawn on the HMD can be 3-D stereoscopic video and binaural audio, potentially turning even simple two-channel audio and 2-D video into a fully immersive 3-D experience. Moreover, even for scenarios which retain the flat, 2-D content of television, the technology herein can add new content or meta-content to a 3-D spatial channel which provide augmented reality video or other images. For example, a user can create windows in space while watching a TV show—the windows might show Twitter® or Facebook® web pages, or layered media content relating to the show.

For any 3-D augmented reality content, each user sees the content based on his or her own unique point of view, parallax correct and tracked for head motions to create a realistic portrayal of virtual objects in the room (hence mixed-reality). For new content or content where we can derive per-pixel depth information with color information to support parallax, we can portray this content as more 3-D than ever. We can take existing 3-D movies and re-project them so that objects that are meant to pop out of the screen do so correctly for each viewer's own vantage point, improving the overall experience individually and as a group.

A standard configuration includes a 2-D television set, a speaker system, a mixed-reality HMD device, with video and audio, and various tracking and processing units throughout the room. Each user experiencing the augmented reality images in the "surround" channel wears the HMD. The orientation of the HMD is calibrated to know where in the room the video display screen is, and where each user is. The content is also coded to have full depth information for even pre-recorded scenes, such as movies.

However, the system is not limited to such advanced content. It can take an existing movie and simply expand the movie beyond the borders of the video display screen, making a virtual theater screen that can be as large as desired. Further, spherical or cylindrical 360 degree video, in stereoscopic format or not, can be portrayed as a sphere or cylinder around the room, where each user can look at whatever part of that volume he or she wishes, independent of where anyone else is looking. In the case of spherical or cylindrical video, rotational head motions can be accommodated.

For full 3-D content, which retains parallax information (e.g., streaming geometry+texture+animation), we can create virtually any viewer position and orientation within the room. For example, two users sitting on opposite sides of the couch can see opposing views of a "Jaws 4-D" shark coming out of the screen. The effect is dramatic, as both will literally see the shark in space between them, instead of the traditional 3-D experience that is both incorrect for individual seating, and exactly the same for each user.

For content that is not panoramic or fully 3-D, e.g., traditional TV or movies, we can still enhance the "surround" experience with side channels. For example, when a cooking show is provided on the television, the HMD can display a recipe in space beside the video display screen, or down around the user's hands in place of a laptop, tablet device or hardcopy book. As another example, a sports channel can broadcast two or three additional screens of information or panoramic imagery to augment the main display. As another example, using the HMD device, a user can call up metadata, such as information from the Internet Movie Database (IMDb®) or streaming layer information that corresponds to the show he or she is watching on television. Such metadata or streaming layer information can be displayed by the HMD device in a floating window beside the video display screen (or anywhere else for that matter).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A user display apparatus, comprising:
a head-mounted display unit including a see-through lens;
an augmented reality emitter, associated with the head-mounted display unit, which emits light to a user's eye, the light represents augmented reality video images;
a camera which provides an image of a video display screen the user is looking at;
at least one sensor which tracks an orientation and location of a head of the user; and
at least one control circuit which identifies edges of the video display screen based on the image provided by the camera, and controls the augmented reality emitter responsive to the at least one sensor, to display the augmented reality video images spatially synchronized with the edges of the video display screen and temporally synchronized with video content displayed by the video display screen.

2. The user display apparatus of claim 1, wherein:
the augmented reality video images augment the video content displayed by the video display screen and appear to the user to be in a static location relative to the video display screen.

3. The user display apparatus of claim 2, wherein:
the augmented reality video images are displayed in a region of space which appears to the user to be adjacent to, and extend outward from, at least one of the edges of the video display screen, do not overlap the video display screen, and appear to the user as a continuation of the content displayed by the video display screen.

4. The user display apparatus of claim 3, wherein:
the augmented reality video images appear as the continuation of the content displayed by the video display screen by including at least one of a color or a lighting element of the video content displayed by the video display screen.

5. The user display apparatus of claim 1, further comprising:
a wireless communication interface which receives timing data, where the augmented reality video images are displayed in temporal synchronism with the video content displayed by the video display screen, in response to the received timing data.

6. The user display apparatus of claim 1, further comprising:
an opacity filter associated with the head-mounted display unit which blocks the user's eye from seeing the video display screen, where the augmented reality video images replace the video content displayed by the video display screen with a larger sized image.

7. A user display apparatus, comprising:
a head-mounted display unit including a see-through lens;
an augmented reality emitter, associated with the head-mounted display unit, which emits light to a user's eye, the light represents augmented reality video images;
at least one sensor which tracks an orientation and location of a head of the user; and
at least one control circuit which operates in temporal and spatial synchronism with video content displayed by a video display screen, the at least one control circuit controls the augmented reality emitter to provide a 3-D display, responsive to the at least one sensor, which is rendered from a perspective of the user, based on the orientation and location of the user's head.

8. The user display apparatus of claim 7, wherein:
the 3-D display comprises at least one audience member which appears to the user to be co-located with the user and to be viewing the video display screen with the user, and the at least one control circuit provides spatialized audio based on a virtual location of the at least one audience member.

9. The user display apparatus of claim 7, further comprising:
a wireless communication interface which receives data, the data comprising timing data, where the 3-D display is provided in synchronism with the video content displayed by the video display screen, in response to the received data.

10. The user display apparatus of claim 7, wherein:
the 3-D display comprises a 3-D object moving through space, away from the video display screen, where the object is rendered from the perspective of the user, based on the orientation and location of the user's head, and is synchronized with the video content displayed by the video display screen.

11. The user display apparatus of claim 10, wherein:
the at least one control circuit controls the augmented reality emitter to display the 3-D object moving through space in response to a detected location of the user.

12. The user display apparatus of claim 10, wherein:
the 3-D object is displayed using a spherical or cylindrical virtual surface, where the display of the object is responsive to rotation of the user's head.

13. A user display apparatus, comprising:
a head-mounted display unit including a see-through lens;
an augmented reality emitter, associated with the head-mounted display unit, which emits light to a user's eye, the light represents 3-D augmented reality images;
at least one sensor which tracks an orientation and location of a head of the user; and
at least one control circuit which controls the augmented reality emitter, responsive to the at least one sensor, to display the augmented reality images, where the augmented reality images appear to the user to be in a static location in a substantially vertical plane when the user looks at a video display screen, the static location in the substantially vertical plane is a specified location relative to the video display screen, and the augmented reality images are temporally synchronized with video content of the video display screen.

14. The user display apparatus of claim 13, wherein:
the augmented reality images appear to the user to be in a static location in a substantially horizontal plane when the user looks down.

15. The user display apparatus of claim 13, wherein:
the augmented reality images are responsive to a streaming layer of web-based information which is associated with video content displayed by the video display screen.

16. The user display apparatus of claim 13, wherein:
the augmented reality images block the video display screen and provide a same video content as the video display screen in a different size than the video display screen.

17. The user display apparatus of claim 13, wherein:
the augmented reality images comprises instructional text which is temporally synchronized with video content displayed by the video display screen.

18. The user display apparatus of claim 1, wherein:
the at least one control circuit recognizes the video display screen in the image provided by the camera based on an expected shape of the video display screen.

19. The user display apparatus of claim 1, wherein:
the at least one control circuit recognizes the video display screen in the image provided by the camera based on a greater light intensity which is seen at a location of the video display screen.

20. The user display apparatus of claim 3, wherein:
the augmented reality video images are displayed on a common vertical plane as the video display screen.

* * * * *